(12) United States Patent
Gopalakrishnan

(10) Patent No.: US 7,873,911 B2
(45) Date of Patent: Jan. 18, 2011

(54) METHODS FOR PROVIDING INFORMATION SERVICES RELATED TO VISUAL IMAGERY

(76) Inventor: Kumar C. Gopalakrishnan, 651 Franklin St., #4208, Mountain View, CA (US) 94041

( * ) Notice: Subject to any disclaimer, the term of this patent is extended or adjusted under 35 U.S.C. 154(b) by 196 days.

(21) Appl. No.: 11/461,713

(22) Filed: Aug. 1, 2006

(65) Prior Publication Data

US 2006/0268007 A1  Nov. 30, 2006

Related U.S. Application Data

(63) Continuation-in-part of application No. 11/215,601, filed on Aug. 30, 2005.

(60) Provisional application No. 60/606,282, filed on Aug. 31, 2004, provisional application No. 60/705,220, filed on Aug. 3, 2005, provisional application No. 60/716,874, filed on Sep. 14, 2005.

(51) Int. Cl.
  *G06F 3/033* (2006.01)
(52) U.S. Cl. .................. 715/764; 715/716; 707/708
(58) Field of Classification Search ............... 715/764, 715/716, 972
  See application file for complete search history.

(56) References Cited

U.S. PATENT DOCUMENTS

| | | | | |
|---|---|---|---|---|
| 5,315,703 A * | 5/1994 | Matheny et al. ............. 715/700 |
| 5,886,698 A * | 3/1999 | Sciammarella et al. ...... 715/769 |
| 5,893,908 A * | 4/1999 | Cullen et al. .................... 707/5 |
| 6,493,001 B1 * | 12/2002 | Takagi et al. ................. 715/759 |
| 6,587,127 B1 * | 7/2003 | Leeke et al. ................. 715/765 |
| 6,614,930 B1 * | 9/2003 | Agnihotri et al. ........... 382/176 |
| 6,636,247 B1 * | 10/2003 | Hamzy et al. ............... 715/808 |
| 6,792,406 B1 * | 9/2004 | Fujimura et al. ............ 704/257 |
| 6,965,890 B1 * | 11/2005 | Dey et al. ........................... 1/1 |
| 7,050,078 B2 * | 5/2006 | Dempski ..................... 715/700 |
| 2001/0003214 A1 * | 6/2001 | Shastri et al. ............... 725/109 |
| 2001/0049826 A1 * | 12/2001 | Wilf ............................ 725/120 |
| 2002/0111960 A1 * | 8/2002 | Irons et al. ................... 707/204 |
| 2003/0071841 A1 * | 4/2003 | Laronge et al. ............. 345/738 |
| 2003/0095681 A1 * | 5/2003 | Burg et al. ................... 382/100 |
| 2003/0112260 A1 * | 6/2003 | Gouzu ......................... 345/716 |
| 2003/0195945 A1 * | 10/2003 | Honda et al. ................ 709/219 |
| 2004/0205514 A1 * | 10/2004 | Sommerer et al. ........ 715/501.1 |
| 2005/0027600 A1 * | 2/2005 | Phillips ........................ 705/14 |
| 2006/0277477 A1 * | 12/2006 | Christenson ................ 715/760 |
| 2009/0119717 A1 * | 5/2009 | Newton et al. ................ 725/59 |

\* cited by examiner

*Primary Examiner*—William L Bashore
*Assistant Examiner*—Ashraf Zahr

(57) ABSTRACT

Methods for providing information services related to visual imagery and operational details of various methods are described. The methods enable the capture of visual imagery, the request and presentation of information services related to the visual imagery, augmentation of visual imagery and continued interaction with the information services.

20 Claims, 12 Drawing Sheets

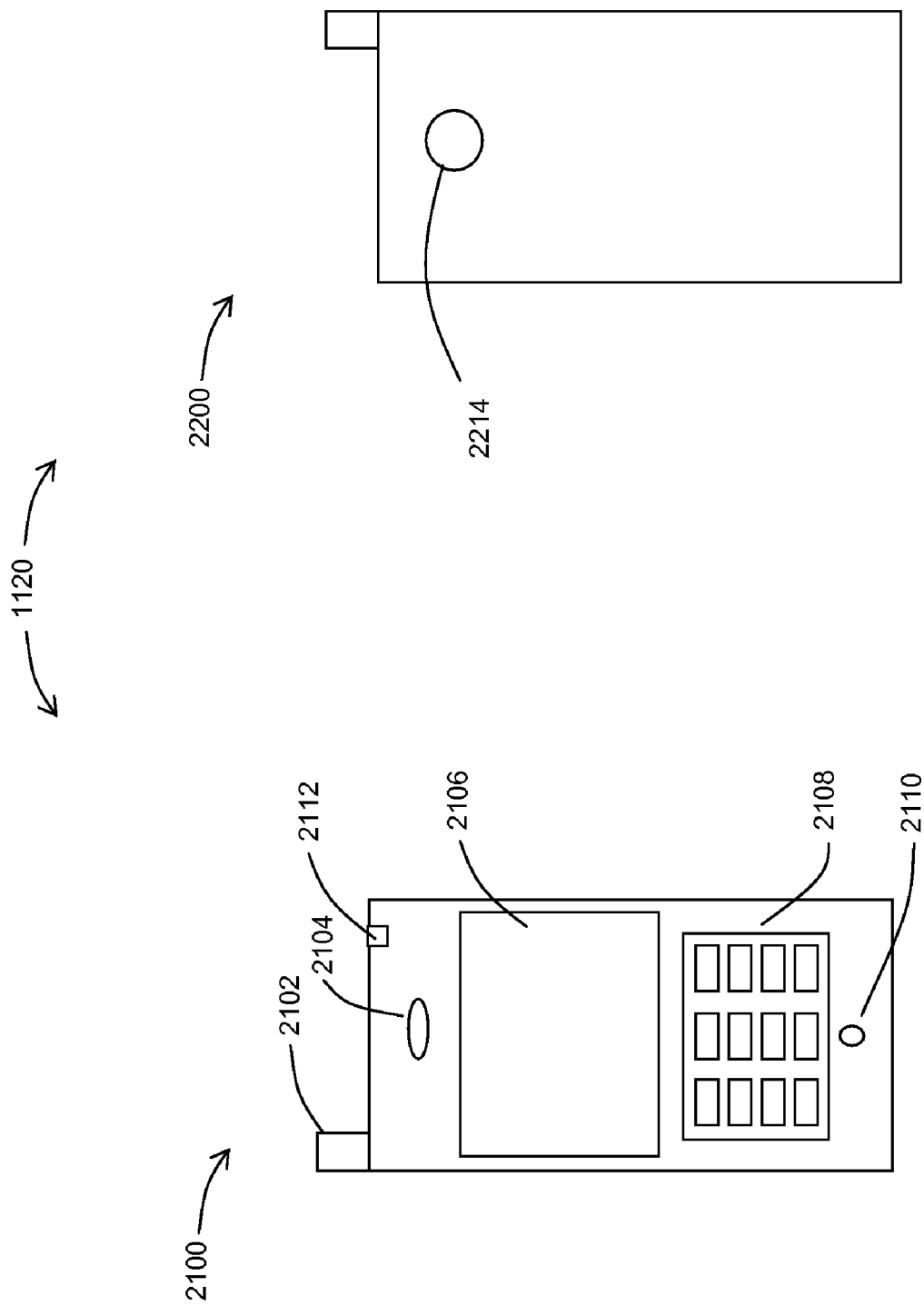

METHODS FOR PROVIDING INFORMATION SERVICES RELATED TO VISUAL IMAGERY

CROSS-REFERENCE TO RELATED APPLICATIONS

This application claims the benefit of U.S. provisional patent application 60/705,220, filed Aug. 3, 2005, and 60/716,874, filed Sep. 14, 2005, and is a continuation-in-part of U.S. patent application Ser. No. 11/215,601, filed Aug. 30, 2005, which claims the benefit of U.S. provisional patent application 60/606,282, filed Aug. 31, 2004. These applications are incorporated by reference along with all other references cited in this application.

BACKGROUND OF THE INVENTION

The present invention is related to providing information services on a computer system. More specifically, the invention describes methods for providing information services related to visual imagery on a computer system.

Systems for providing information services related to visual codes such as bar codes exist. However, a mechanism for providing information services related to visual imagery without the need for any specific visual codes is in need.

BRIEF SUMMARY OF THE INVENTION

The present invention describes methods for providing information services related to visual imagery. The methods enable the providing of the information services by providing a user experience for requesting, presenting, and interacting with the information services. Various methods may also enable refining of the information services presented, use of multiple user identities, stateful operation of the system and augmented presentation of visual imagery.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 2(a) illustrates the components of a client device, in accordance with an embodiment.

FIG. 2(b) illustrates the components of an alternate view of a client device, in accordance with an embodiment.

DETAILED DESCRIPTION OF THE INVENTION

Figure 1:
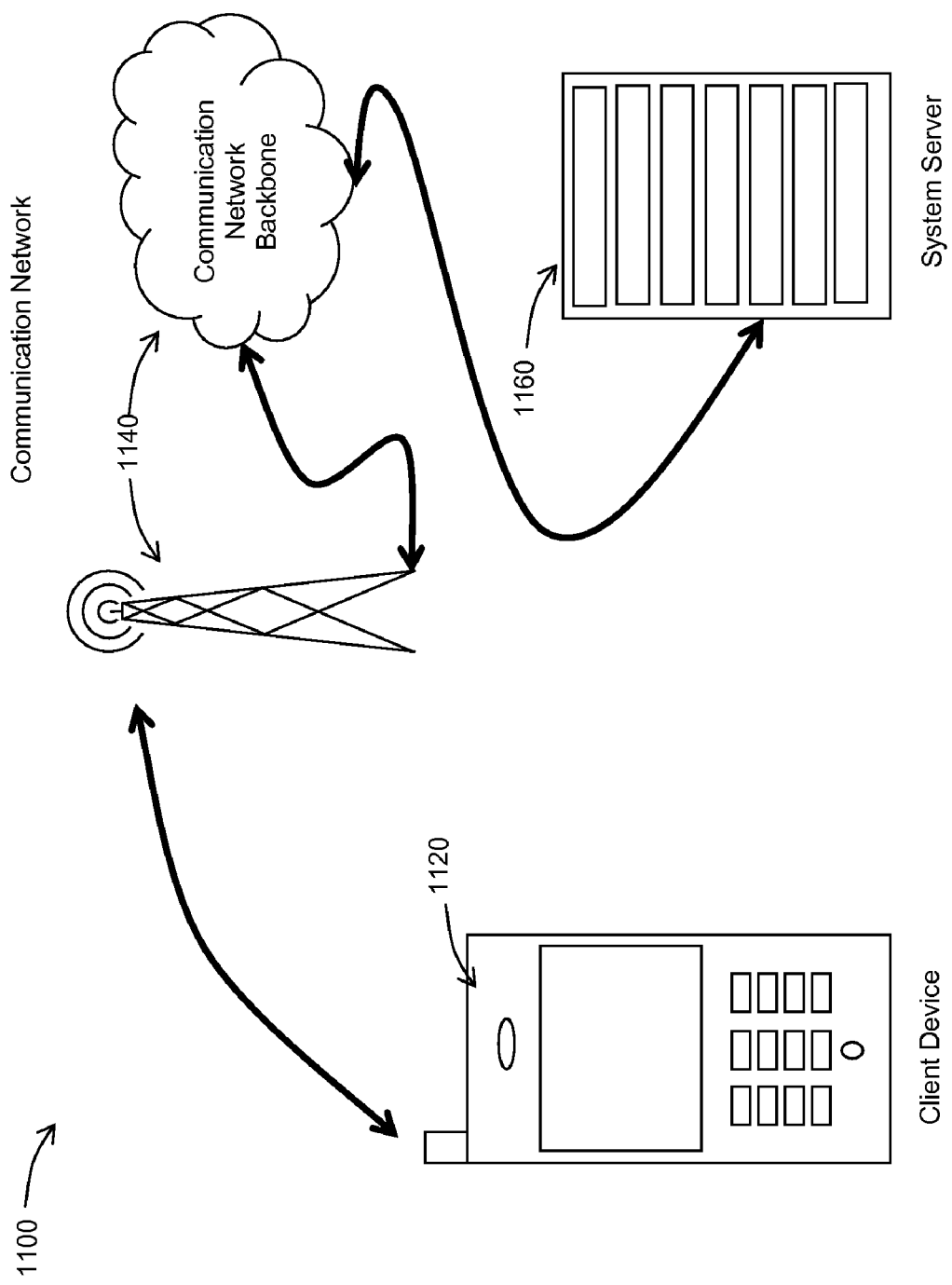
FIG. 1 illustrates the components of the system, in accordance with an embodiment.

A system and methods are described for providing information services related to visual imagery. Various embodiments present mechanisms for providing information services related to visual imagery. The specific embodiments described in this description represent exemplary instances of the present invention, and are illustrative in nature rather than restrictive.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" or "some embodiments" means that a particular feature, structure, or characteristic described in connection with the embodiment is included in at least one embodiment of the invention. The appearances of the phrase "in one embodiment" or "some embodiments" in various places in the specification are not necessarily all referring to the same embodiment, nor are separate or alternative embodiments mutually exclusive of other embodiments. Features and aspects of various embodiments may be integrated into other embodiments, and embodiments illustrated in this document may be implemented without all of the features or aspects illustrated or described.

Various embodiments may be implemented in a computer system as software, hardware, firmware, or a combination of these. Also, an embodiment may be implemented either in a single monolithic computer system or over a distributed system of computers interconnected by a communication network. While the description below presents the full functionality of the invention, the mechanisms presented in the invention are configurable to the capabilities of the computer system on which it is implemented, the resources available in the computer system on which it is implemented and the requirements for providing information services related to visual imagery.

In the context of this description, the term "system" refers to a system that provides information services related to visual imagery.

In the context of this description, the term "information service" is used to refer to a user experience provided by the system that may include the logic to present the user experience, multimedia content used to provide the user experience, and related user interfaces. The term "content" is used to refer to multimedia data used in the information services. Content included in an information service may be in text, audio, video or graphical formats. For example, an information service may be comprised of text. Another exemplary information service may be comprised of text, video and associated controls for playing the video information. In some embodiments, information services may include information retrieved from various sources such as Web sites, Web search engines, news agencies, e-commerce storefronts, comparison shopping engines, entertainment content, games, and the like. In other embodiments, the information services may modify or add new components (e.g., software applications, ring tones, contact information) to the client device on which the user interface is implemented.

In the context of this description, the term "visual imagery" refers to a single still image, a plurality of still images, a single video sequence, a plurality of video sequences or combinations thereof. Visual imagery may also include associated metadata such as capture device characteristics, file format characteristics, audio, tags, time of capture, location of capture, author name, filename, and the like. In the context of this description, the term "visual element" refers to text, numbers, icons, symbols, pictograms, ideograms, graphical primitives, and other such elements in a visual imagery and their layout and formatting information in the visual imagery.

In the context of this description, the term "user interface element" refers to icons, text boxes, menus, graphical buttons, check boxes, sounds, animations, lists, and the like that constitute a user interface. The terms "widget" and "control" are also used to refer to user interface elements. In the context of this description, the term "input component" refers to a component integrated into the system such as a key, button, joystick, touch pad, motion sensing device, speech input, and the like that can be used to input information to the user interface. In the context of this description, the term "cursor control component" refers to a component integrated into the system such as a key, button, joystick, touch pad, motion sensing device, speech input, and the like that can be used to control a cursor on the user interface. In the context of this description, the term "navigational component" refers to a component integrated into the system such as a key, button, joystick, touch pad, motion sensing device, speech input, and the like that can be used to select, control, and switch between various user interface elements. In the context of this description, the term "menu command" refers to a command associated a menu item on the user interface.

FIG. 1 illustrates the components of exemplary system 1100 comprised of client device 1120, system server 1160 and communication network 1140 connecting the client device and system server.

FIGS. 2(a) and 2(b) illustrate the components of an exemplary client device 1120 on which information services related to visual imagery may be provided, e.g., a camera phone. Front view of client device 2100 illustrated in FIG. 2(a) shows the communication antenna 2102, speaker 2104, display 2106, keypad 2108, microphone 2110 and visual indicator (e.g., LED) 2112. Rear view of client device 2200 illustrated in FIG. 2(b) shows the integrated camera 2214. In some embodiments, client device 1120 may include other input components such as a joystick, thumbwheel, scroll wheel, touch sensitive panel, touch sensitive display, or additional keys.

Exemplary User-Interface Architecture

The user interface for accessing, presenting, and interacting with information services related to visual imagery on the client device 1120 may be comprised of both visual and audio components. Visual components of the user interface may be presented on display 2106 and the audio components on speaker 2104. User inputs may be acquired by the system through camera 2214, microphone 2110, keypad 2108, and other input components integrated into client device 1120. In some embodiments, the user interface may be presented using a plurality of devices that together provide the functionality of client device 1120. For instance, visual components of the user interface may be presented on a television set while user inputs are obtained from a television remote control.

The visual component of the user interface may include a plurality of visual representations herein termed as "views." Each view may be configured to address the needs of a specific set of functions of the system as further described.

A "login view" may enable authentication to the system. A "camera view" may enable capture of visual imagery and include a viewfinder to present visual imagery. In some embodiments, the viewfinder may encompass the entire camera view.

Information services may be presented in "index" and "content" views. An index view may be used to present one or more information services. A user may browse through the available set of information service options presented in an index view and select one or more information services to be presented in a content view or using components external to the system (e.g., a web browser). The information services presented in the index view may have a compact representation to optimize the use of the display area. The content view may be used to present an information service in its full form.

Help information related to the system may be presented in a "help view." In addition, transient information services may be presented in a "transient information view." The user may also interact with the views using various control widgets embedded in the information service, controls such as menu commands integrated into the user interface and appropriate input components integrated into client device 1120.

The views described here may include controls for controlling the presentation of information in audio or video format. The controls may enable features such as play, pause, stop, forward, and reverse of the audio or video information. Audio information may be presented through speaker 2104 or other audio output component connected to the system.

In some embodiments, the user interface may be integrated in its entirety into the system. For example, the user interface may be implemented by a software application (e.g., in environments like J2ME, Symbian, and the like) that is part of the system. In other embodiments, some components of the user interface may be implemented by components external to the system. For example, the camera view may be integrated into a camera software application or the index and content views may be integrated into a World Wide Web browser.

User-Interface Input Mechanisms

In the context of this description, the term "click" refers to an user input on the user interface wherein, the user clicks on a key, button, joystick, scroll wheel, thumb wheel or equivalent integrated into client device 1120, the user flicks a joystick integrated into client device 1120, the user spins or clicks a scroll wheel, thumb wheel or equivalent, or the user taps on a touch sensitive or pressure sensitive input component. In the context of this description, the term "flick" refers to a movement of a joystick, scroll wheel, or thumb wheel in one of its directions of motion.

In addition, in the context of this description, the term "click" may refer to 1) the transitioning of an input component from its default state to a selected or clicked state (e.g. key press), 2) the transitioning of an input component from its selected or clicked state to its default state (e.g. key release) or 3) the transitioning of an input component from its default state to a selected or clicked state followed by its transitioning back from the selected or clicked state to its default state (e.g. key press followed by a key release). The action to be initiated by the click input may be triggered on any of the three versions of click events defined above as determined by the implementation of a specific embodiment.

In addition, input components may also exhibit a bistate behavior wherein clicking on the input component once transitions it to a clicked state in which it continues to remain. If the input component is clicked again, the input component is returned to its default or unclicked state. This bistate behavior is termed "toggle" in the context of this description.

In the context of this description, the term "click hold" is used to refer to a user input on the user interface that has an extended temporal duration. For example, the user may click on a key or button integrated into the client device and hold it in its clicked state or the user may click on a joystick integrated into the client device and hold it in its clicked state or the user may flick a joystick integrated into client device 1120 and hold it in its flicked state or the user may spin or click a scroll wheel, thumb wheel or equivalent and hold the wheel in its engaged state or the user may input a single input on a touch sensitive or pressure sensitive input component and continue the input in an uninterrupted manner.

The end of the click hold operation, and hence the duration of the click hold event, is marked by the return of the input component to its default or unclicked state. The action to be initiated by the click hold input may be triggered either at the transition of a key from its default state to its clicked state, after the user holds the input component in its clicked state for a previously specified period of time or on return of the input component from its clicked state to its default state.

The difference between a click and a click hold is that a click represents an instantaneous moment, while a click hold represents a duration of time, with the start and end of the duration marked by the click and the release or return of the input component to its unclicked or default state.

In addition to clicks, click holds and toggles, the motion of the client device by itself may be used to represent input events, in certain embodiments. For instance, in embodiments that are integrated into a client device equipped with a camera (e.g., a camera phone), motion tracking and estimation processes are used on the visual imagery captured with the camera to detect the motion of client device 1120 relative to its environment.

In other embodiments, the motion of client device 1120 may be sensed using other motion sensing mechanisms such as accelerometers and spatial triangulation mechanisms such as the Global Positioning System (GPS). Specific patterns in the motion of the client device, thus inferred, are used to represent clicks and click hold events. For instance, unique gestures such as the motion of the client device perpendicular to the plane of the camera sensor, a circular motion of the client device or a quick lateral movement of the client device are detected from the motion sensing mechanisms and used to represent various click and click hold events. In addition, a plurality of such unique gestures may be used to represent a plurality of unique click, click hold and toggle events.

In some embodiments, speech input may also be used to generate commands equivalent to clicks, click holds, and toggles using speech and voice recognition components integrated into the system. Further, speech input may also be used for control cursor, highlighting, selection of items in lists and selection of hyperlinks.

Graphical Widgets, their Selection and Operation

Clicks, click holds, toggles, and equivalent inputs may optionally be associated with visual feedback in the form of widgets integrated into the user interface. An example of a simple widget integrated into the user interface is a graphical button on the client device's display 2106. In some embodiments, a plurality of such widgets integrated into the user interface may be used in conjunction with an input component, to provide a plurality of functionalities for the input component. For example, a joystick may be used to move a selection cursor between a number of graphical buttons presented on the client display to select a specific mode of operation. Once a specific mode of operation has been selected, the system may present the user interface for the selected mode of operation which may include redefinition of the actions associated with the activation of the various input components used by the system. Effectively, such a graphical user interface enables the functionality of a plurality of "virtual" user interface elements (e.g. graphical buttons) using a single physical user interface component (e.g., joystick).

Using an input component to interact with multiple widgets in a graphical user interface may involve a two step process: 1) a step of selecting a specific widget on the user interface to interact with and 2) a step of activating the widget.

The first step of selecting a widget is performed by pointing at the widget with an "arrowhead" mouse pointer, a cross hair pointer or by moving widget highlights, borders and the like, upon which the widget may transition from the unselected to selected state. Moving the cursor away from a widget may transition it from the selected to unselected state. The second step of activating the widget is analogous to the click or click hold operations described earlier for physical input components.

In the context of this description, the term "widget select" is used to describe one of the following operations: 1) the transitioning of a widget from unselected to selected state, 2) the transitioning of a widget from selected to unselected state, or 3) the transitioning of a widget from unselected to selected state followed by its transitioning from selected to unselected state. The term "widget activate" is used to refer to one of the following operations: 1) the transitioning of a widget from inactive to active state, 2) the transitioning of a widget from active to inactive state, or 3) the transitioning of a widget from inactive to active state followed by its transitioning from active to inactive state. A "widget hold" event may be generated by the transitioning of a widget from inactive to active state and the holding of the widget in its active state for an extended duration of time. The return of the widget to its default or inactive state may mark the end of the widget hold event.

In addition, widgets may optionally exhibit a bistate behavior wherein clicking on the input component once while a widget is selected transitions it to an activated state in which it continues to remain. If the widget which is now in its activated state is selected and the input component clicked again, the widget is returned to its default or inactive state. This bistate behavior is termed "widget toggle."

Widget activate, widget hold and widget toggle events may be generated by the user using clicks, click holds, toggles and equivalent inputs generated using an input component integrated into client device 1120, in conjunction with widgets selected on the graphical user interface.

The selection of a widget on the user interface may be represented by changes in the visual appearance of a widget, e.g., through use of highlights, color changes, icon changes, animation, drawing of a border around the widget or other equivalent visual feedback, through the use of audio feedback such as sounds or beeps or through tactile feedback such as vibrations. Similarly, the activation of a widget using a widget activate operation or an extended activation of a widget using a widget hold operation may be represented by changes in the visual appearance of a widget, e.g., through use of highlights, color changes, icon changes, animation, drawing of a border around the widget or other equivalent visual feedback, through use of audio feedback such as sounds or beeps or through tactile feedback such as vibrations.

Widget select events may be input using an input component that supports selection between a plurality of widgets such as a mouse, joystick, scroll wheel, thumb wheel, touch pad or cursor control keys. Widget activate, widget toggle and widget hold events may be input using input components such as a mouse, joystick, touch pad, scroll wheel, thumb wheel or hard or soft buttons. In addition, the motion of client device 1120 by itself may be used to control the cursor and generate widget select, widget activate, widget toggle and widget hold events, in certain embodiments.

For instance, in some embodiments, motion tracking or estimation mechanisms may be used on the visual imagery captured with camera 2214 to detect the motion of the client device relative to its environment and used to control the movement of the cursor, i.e., for widget select events. In such an embodiment, the motion of the cursor or the selection of widgets mimics the motion of client device 1120. Specific patterns in the motion of client device 1120, may be used to represent widget activate and widget hold events. For instance, unique gestures such as the motion of client device 1120 perpendicular to the plane of the camera sensor, a circular motion of client device 1120 or a quick lateral movement of client device 1120 may be detected from the motion sensing mechanisms and are used to represent various widget activate and widget hold events. The motion of the client device may also be optionally sensed using other motion sensing mechanisms such as accelerometers and triangulation mechanisms such as the Global Positioning System.

In some embodiments, speech input may also be used to generate commands equivalent to click, click hold, toggle, widget select, widget activate, and widget hold events using speech and voice recognition components integrated into the system.

Equivalency of User Interface Inputs

In some embodiments, clicks may be substituted with a click hold, where the embodiment may interpret the click hold such as to automatically generate a click or toggle event from the click hold user input using various system and environmental parameters. For instance, in some embodiments, upon the start of the click hold input or a toggle, the system may monitor the visual imagery for any changes in the characteristics of the visual imagery such as average brightness and automatically capture a still image when such a change occurs and in the process emulates a click. In some embodiments, upon start of a user input click hold event or a toggle, a system timer may be used to automatically capture a still image after a preset interval or a preset number of video frames and in the process emulate a click.

In some embodiments, a click or toggle may be substituted for a click hold. In this case, the implicit duration of the click hold event represented by a click or toggle may be determined automatically by the system based on various system and environmental parameters as determined by the implementation. Similarly, widget activate, widget toggle, and widget hold operations may also be optionally used interchangeably when used in conjunction with additional system or environmental inputs, as in the case of clicks and click holds.

While the following description describes the operation of embodiments using clicks and click holds, other embodiments may substitute these inputs with toggle, widget select, widget activate, widget toggle, and widget hold operations. For instance, in some embodiments, the selection of a button widget may be interpreted as equivalent to a click. In some embodiments, some user interface inputs may be in the form of spoken commands that are interpreted using speech recognition.

Features of Visual Components of User Interface

A user using the system for accessing information services related to visual imagery first captures live visual imagery or selects it from storage and then requests related information services. Upon capture of visual imagery or its selection from storage, the selected or captured visual imagery may be optionally displayed on the user interface.

In some embodiments, where a single still image is captured with the camera or selected from storage, the still image may be displayed on the user interface. In some embodiments, where a plurality of still images or video sequences or combinations thereof are captured from the camera or selected from stored visual imagery, the visual imagery may be displayed in a tiled layout or as a filmstrip on the user interface. When displaying video sequences in tiled layout or filmstrip form, the video sequence itself is played or a specific frame of the video sequence is displayed as a still image. When the visual imagery is comprised of a plurality of still images or video sequences, in some embodiments, only the first or last still image or video sequence to be captured or selected by the user may be presented on the user interface.

In some embodiments, users may request information services related to selected spatiotemporal regions of the visual imagery. Spatiotemporal regions for which a user requests related information services may be represented in the visual imagery displayed on the user interface using various markers such as icons, highlights, overlays, and timelines to explicitly show the demarcation of the spatiotemporal regions in the visual imagery. For instance, a rectangular region selected by the user in a still image may be represented by a rectangular graphic overlaid on the still image. The selection of a specific spatial region of visual imagery in the form of a video sequence is represented by the embedding of a marker in the spatial region through the duration of the video sequence. Examples of such a marker are a change in the brightness, contrast, or color statistics of the selected region such that it stands out from the rest of the visual imagery.

In some embodiments that use input components in conjunction with selectable widgets on the user interface, the process of selecting a widget on the user interface and widget activating or widget toggling or widget holding using a input component is intended to provide a look and feel analogous to clicking or toggling or click holding respectively on an input component used without any associated user interface widgets. For instance, selecting a widget in the form of a graphical button by moving a cursor in the form of a border around the button using a joystick and activating the widget by clicking on the joystick is a user experience equivalent to clicking on a specific physical button.

Similarly, in some embodiments that use input components in conjunction with selectable widgets on the user interface, the process of requesting information services related to a given visual imagery may require the user to select visual imagery displayed in the form of widgets on the user interface such as a viewfinder, tiled layout or filmstrip as described earlier, and widget activate the visual imagery. Such a process provides a user experience that is analogous to "clicking" on the visual imagery.

Features of Audio Components of User Interface

In some embodiments, the user interface may employ audio cues to denote various events in the system. For instance, the system may generate audio signals (e.g., audio tones, audio recordings) when the user switches between different views, inputs information in the user interface, uses input components integrated into the client device (e.g., click, click hold, toggle), uses widgets integrated into the client device user interface (e.g., widget select, widget activate, widget toggle, widget hold) or to provide an audio rendering of system status and features (e.g., system busy status, updating of progress bar, display of menu options, readout of menu options, readout of information options).

In some embodiments, the system may provide an audio rendering of various information elements obtained by processing the visual imagery. The user may then select segments of the audio rendering that are representative of spatiotemporal regions of the visual imagery for which the user is interested in requesting related information services. This process enables users to request information services related to visual imagery without relying on the visual components of the user interface. Users may mark the segments of audio corresponding to the spatiotemporal regions of the visual imagery they are interested in, using various input mechanisms described earlier.

In some embodiments, the system may provide an audio rendering of the information in various media types in the information services generated by the system as related to visual imagery. This enables users to browse and listen to the information services without using the visual components of the user interface. This feature in conjunction with the other audio feedback mechanisms presented earlier may enable a user to use all features of the system using only the audio components of the user interface, i.e., without using the visual components of the user interface.

Operation of Exemplary Embodiments

The operation of the system may involve capturing of the visual imagery, requesting of information services related to visual imagery, identification of related information services, providing of related information services, presentation of the related information services, optionally in compact form, selection of one or more information services for presentation optionally in their entirety, and the presentation of the selected information services. The process of requesting related information services may be initiated explicitly by the user through user inputs or triggered automatically by the system or environmental events monitored by the system.

In some embodiments, the request for information services related to visual imagery may be generated by client device 1120 and communicated to system server 1160 over communication network 1140. The system server 1160, upon receiving the request, generates the information services. The process of generating the related information services may involve the generation of a plurality of contexts from the visual imagery, associated metadata, information extracted from the visual imagery, and knowledge derived from knowledgebases. A plurality of information services related to the generated contexts may be identified from a plurality of information service sources or knowledgebases. The information services identified as related to the contexts and hence to the visual imagery may then be presented to the user on the client device.

User interface views integrated into system 1100 may enable users to capture visual imagery, request related information services and interact with the related information services. Users may use the different views of the user interface to perform various functions related to requesting, accessing, and using the information services. Users may interact with the user interface through use of appropriate input components integrated into client device 1120.

In some embodiments, operation of the system may require the use of one view (e.g., camera view) of the user interface for capturing the visual imagery, the use of another view (e.g., index view) for presenting the plurality of information services in compact form and the use of another view (e.g., content view) for the presentation of the information services in their entirety. In some embodiments, in response to a request for information services related to a visual imagery, the system may present a single information service as most relevant to a visual imagery, for instance in the content view, without presenting a plurality of information services.

A user using the system to request information services related to visual imagery may first capture visual imagery or select it from storage and then request related information services. In some embodiments, the system presents the captured visual imagery and then the requested information services. In some other embodiments, information services may be presented as the visual imagery is being captured or retrieved from storage, over an extended period of time. In such embodiments, the visual imagery may have extended time duration as in the case of a video sequence or a sequence of still images. Information services related to the visual imagery may be presented as the visual imagery is being communicated or streamed from the client device to system server and processed by the system server. The information services being presented may also be updated continually as the visual imagery is communicated to the system server.

In some embodiments, the information services provided by the system may be presented independent of the visual imagery, for instance, in a separate view of the user interface from the one used to present the visual imagery. In some embodiments, the information services provided by the system may be presented along with the captured visual imagery, for instance, in the same view of the user interface as the captured visual imagery. In some embodiments, the information services may also be presented such that they augment the captured visual imagery.

In some embodiments, transient information services may be presented between the various steps of system operation. For instance, in some embodiments, transient information services may be presented when the system is busy processing or communicating information. In some embodiments, transient information services may be presented for providing sponsored information services. In some embodiments, transient information services may be presented as an interstitial view between displaying different views of the user interface.

The process of capturing visual imagery and the requesting of related information services may use one of the modes of operation discussed below. While the following modes of operation describe the capture of visual imagery, other associated information such as metadata of the visual imagery and other user and system inputs may also be captured along with the visual imagery and used to provide related information services.

One-Step Mode of Operation

Here, the operation of some embodiments in which a user requests information services related to visual imagery using a single step of inputs is described. The single step may comprise of a set of user inputs that is used for both capturing visual imagery and requesting related information services.

In some embodiments, the single step of inputs may trigger the capture of visual imagery by client device 1120, creation of a request for related information services, communication of the request to system server 1160, identification and generation of the related information services by system server, communication of the information services to the client device and presentation of the information services on the client device user interface.

In some embodiments, a one-step mode of operation may be used to request information services related to a single still image captured using the camera integrated into the client device. Here, the user points the camera integrated into client device 1120 at the scene of interest and inputs a click on an input component. Upon that single user input, visual imagery is captured by the client device and a request for related information services is generated. Optionally, the captured still image may be displayed on the user interface. Then the information services related to the still image obtained from the system server may be presented to the user on the client device user interface.

This one-step mode of operation is analogous to taking a picture using a camera with a single click. In this embodiment, upon the user inputting a single click, a still image is captured and the user is presented one or more related information services as opposed to simple storage of the captured image, as in the case of a camera. Further, exactly a single click may be required to capture the image and to request related information services in the one-step mode of operation, when the captured visual imagery is in the form of a single still image.

FIG. 3(*a*) illustrates an exemplary process 3100 for capturing a single still image using camera 2214 integrated into client device 1120 and requesting related information services using a one-step mode of operation. Process 3100 and other processes of this description may be implemented as a set of modules, which may be process modules or operations, software modules with associated functions or effects, hardware modules designed to fulfill the process operations, or some combination of the various types of modules. The modules of process 3100 and other processes described herein may be rearranged, such as in a parallel or serial fashion, and may be reordered, combined, or subdivided in various embodiments.

Here, a user views the visual scene using the viewfinder integrated into the camera view 3110. The user may optionally align the visual imagery displayed in the viewfinder as required in some embodiments 3120. The user then clicks on a joystick to trigger the system to capture a single still image and simultaneously request related information services 3130. The captured still image may optionally be presented in the user interface while the system retrieves related information services 3140. The related information services may be then presented in the index view or content view 3160. In some embodiments, transient information services may be presented before information services related to the visual imagery are presented 3150.

In some embodiments, the one step operation described above for visual imagery comprised of a single still image may be repeated iteratively. In such embodiments, in each cycle of the iteration a single still image may be captured and information services are requested after the capture of the still image. The information services presented in each cycle may be identified and provided based on one or more of the still images captured until that iteration. In this mode of operation, in "N" cycles, the user inputs "N" number of clicks for capturing "N" still images and requesting related information services. This mode of operation helps a user to iteratively filter the obtained information services by providing additional visual imagery input each time.

In some embodiments, a one-step mode of operation may be used to request information services related to a single still image obtained from storage. Here, the user navigates the visual imagery available in storage and selects a still image in order to retrieve information services related to it. The images may be stored in client device 1120 or on system server 1160. In some embodiments, the images available in the system may be presented on the client device user interface with decreased dimensions (i.e., as thumbnails) representative of the images. The user input for the selection of the still image also triggers the request for related information services from the system server. Optionally, the selected still image may be displayed on the user interface. Then the information services related to the still image obtained from the system server may be presented to the user on the client device user interface.

In some embodiments, a one-step mode of operation may be used to request information services related to a contiguous set of still images or a single video sequence captured using the camera integrated into the client device. Here, the user points the camera integrated into the client device at the scene of interest and initiates a click hold on an input component to begin capture of the visual imagery. The system then captures a contiguous set of still images or a video sequence, depending upon the embodiment. Upon termination of the click hold, the visual imagery is used to request related information services. Optionally, the captured visual imagery may be displayed on the user interface. Then the information services related to the visual imagery obtained from the system server may be presented to the user on the client device user interface.

In some embodiments, a one-step mode of operation may be used to request information services related to a single video sequence obtained from storage. Here, the user navigates the visual imagery available in storage and selects a video sequence in order to retrieve information services related to it. The video sequences may be stored in client device 1120 or on system server 1160. In some embodiments, the video sequences available in the system may be presented on the client device user interface with decreased dimensions (i.e., as thumbnails) representative of the video sequences. The user input for the selection of the video sequence also triggers the request for related information services from the system server. Optionally, the selected video sequence may be displayed on the user interface. Then the information services related to the video sequence obtained from the system server may be presented to the user on the client device user interface.

In some embodiments, a one-step mode of operation may be used to request information services related to visual imagery in the form of a plurality of still images, a plurality of video sequences or a combination thereof, captured live from the camera integrated into the client device or obtained from storage. Here, the user captures or selects each of the visual imagery using inputs as discussed earlier. The final user input may also serve as the trigger for request of information services related to the visual imagery. For instance, if the user has not made any additional input for a predetermined duration, the system may interpret the last input as a request for information services related to the set of visual imagery captured or selected so far. In some embodiments, the choice of capturing or selecting visual imagery in the form of a single still image versus a plurality of still images versus a single video sequence versus a plurality of video sequences versus a combination thereof, upon user input, may be automatically made by the system based on parameters such as system timers, user preferences or changes in characteristics of the visual imagery. Further, in the one-step mode of operation, exactly "N" user inputs may be required for requesting information services related to "N" still images captured by a user.

Two-Step Mode of Operation

Here, the operation of some embodiments in which a user requests information services related to visual imagery using two steps of inputs is described. The first step consists of a set of user inputs for capturing visual imagery. The second step consists of a set of user inputs for requesting related information services.

In some embodiments, the first step of operation may trigger the capture of visual imagery by client device 1120. Then, the second step of operation may trigger the creation of a request for related information services, communication of the request to system server 1160, identification and generation of the related information services by system server, communication of the information services to the client device and presentation of the information services on the client device user interface.

In some embodiments, a two-step mode of operation may be used to request information services related to a single still image captured using the camera integrated into the client device. Here, in the first step of operation, the user points the camera integrated into the client device at the scene of interest and inputs a click on an input component to capture a single still image. Optionally, the captured still image may be displayed on the user interface. The user may then request information services related to the still image, in the second step of operation, using an input in the form of a single click. Then the information services related to the still image obtained from the system server may be presented to the user on the client device user interface. Some embodiments may include visual feedback on the user interface such that the captured and displayed visual imagery is highlighted before the user makes the second click. This process in effect creates the user experience of clicking on the captured image.

In some embodiments, using a two-step mode of operation for requesting information services related to a single still image captured using a camera, only two clicks are required—one for capturing the still image and the other for requesting information services.

Figure 3A:
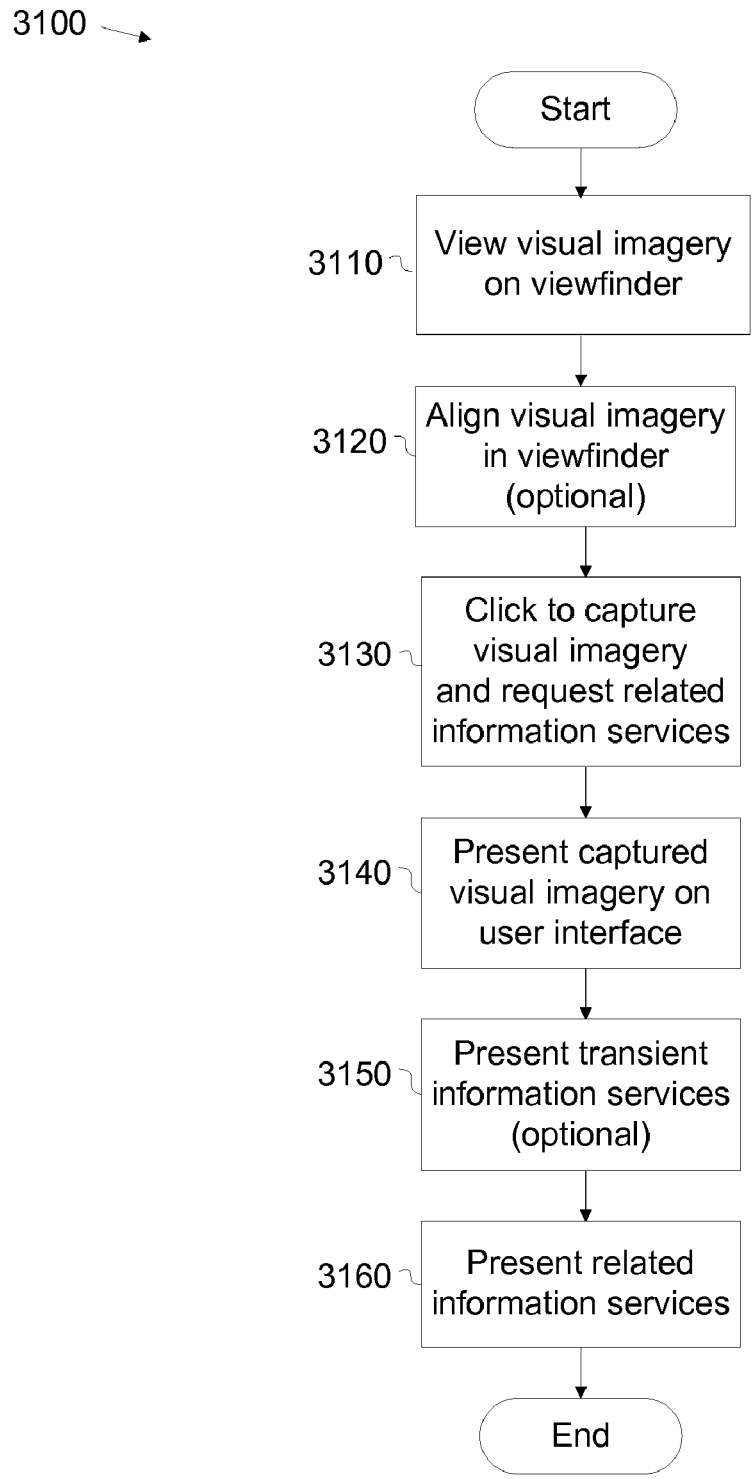
FIG. 3(a) illustrates an exemplary process for requesting information services related to visual imagery using a one-step mode of operation, in accordance with an embodiment.
Figure 3B:
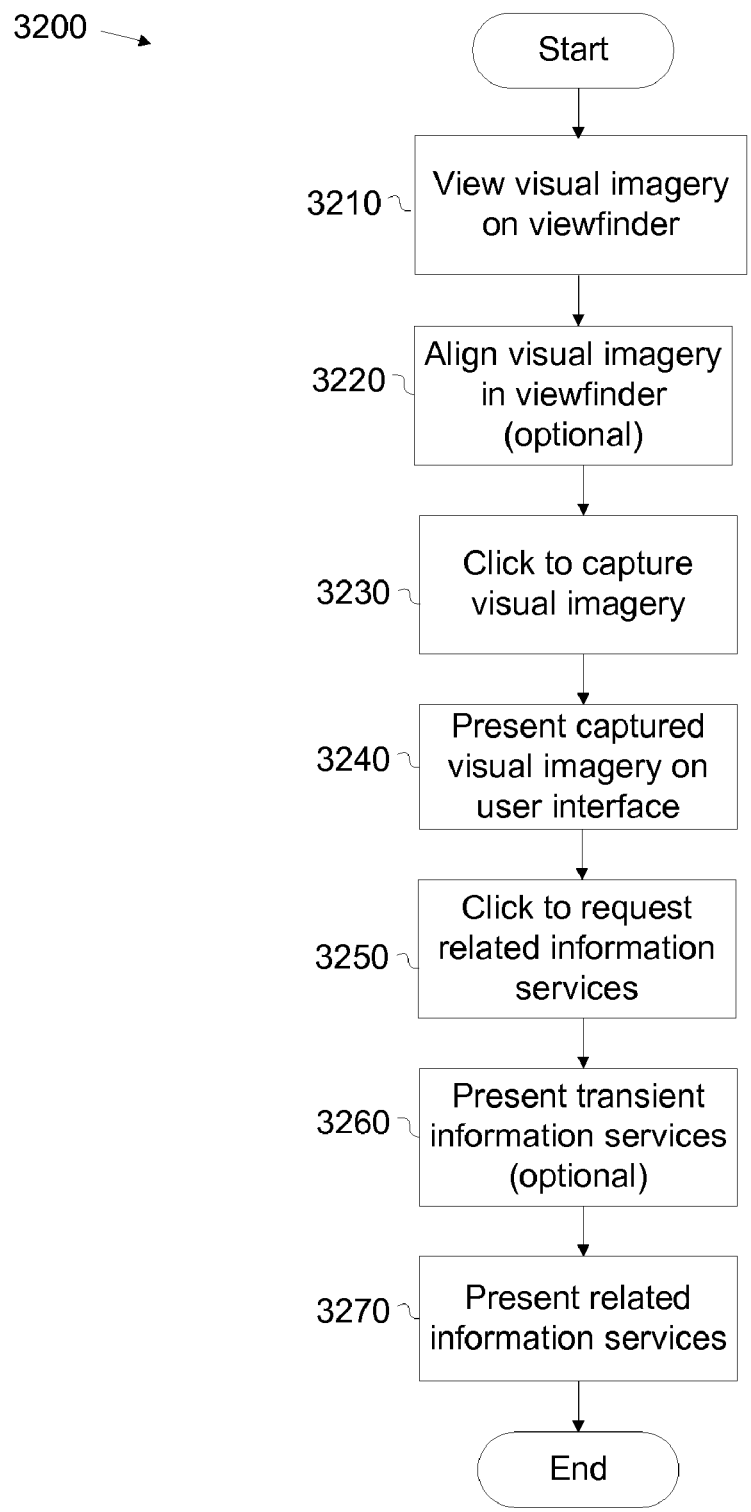
FIG. 3(b) illustrates an exemplary process for requesting information services related to visual imagery using a two-step mode of operation, in accordance with an embodiment.
Figure 3C:
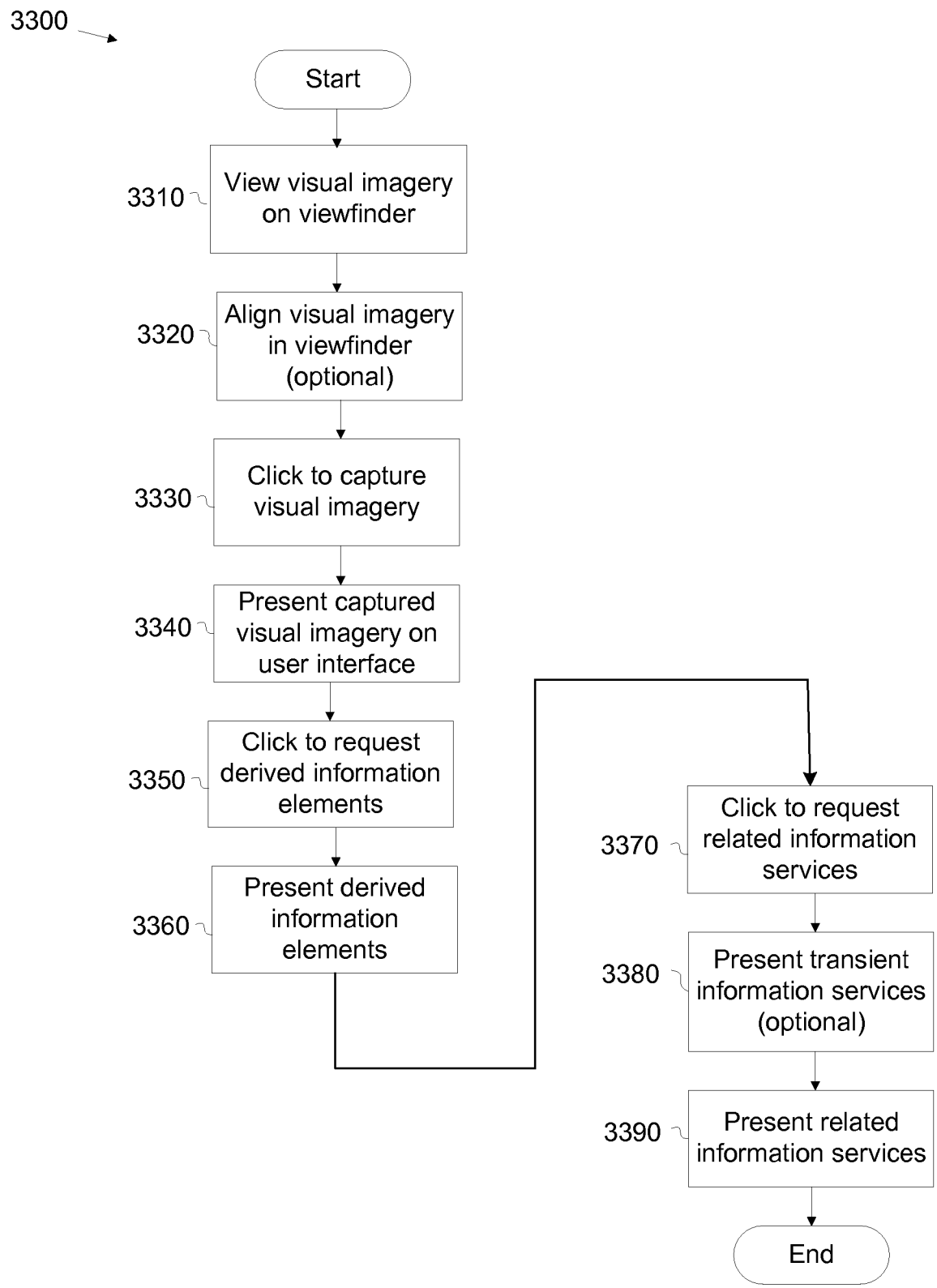
FIG. 3(c) illustrates an exemplary process for requesting information services related to visual imagery using a three-step mode of operation, in accordance with an embodiment.

FIG. 3(b) illustrates an exemplary process 3200 for capturing a single still image using camera 2214 integrated into client device 1120 and requesting related information services using a two-step mode of operation. Here, a user views the visual scene using viewfinder integrated into the camera view 3210. The user may optionally align the visual imagery displayed in the viewfinder as required in some embodiments 3220. The user then clicks on a joystick to trigger the system to capture a single still image 3230. The captured still image may be presented in the user interface in viewfinder 3240. The user then requests related information services with a second click 3250. In some embodiments, transient information services may be presented in the transient information view while the information services related to the visual imagery are being generated by the system 3260. The related information services may be then presented in the index view or content view 3270.

In some embodiments, the two step operation described above for visual imagery comprised of a single still image may be repeated iteratively. In such embodiments, in each cycle of the iteration a single still image may be captured and information services are requested after the capture of the still image. The information services presented in each cycle may be identified and provided based on one or more of the still images captured until that iteration. In this mode of operation, in "N" cycles, the user inputs "N" number of clicks for the first step of capturing the still images and "N" number of clicks for the second step to request related information services. This mode of operation helps a user to iteratively filter the obtained information services by providing additional visual imagery input with each iteration.

In some embodiments, a two-step mode of operation may be used to request information services related to a set of N still images captured using the camera integrated into the client device. Here, in the first step of operation, the user points the camera integrated into the client device at the scenes of interest and inputs N clicks on an input component to capture a set of N still images. Optionally, the captured still images may be displayed on the user interface. The user may then request information services related to the still images, in the second step of operation, using an input in the form of a single click. Then the information services related to the still image obtained from the system server may be presented to the user on the client device user interface. Thus, exactly N+1 inputs are required to request information services related to N still images—"N" clicks for capturing the images and one click for requesting information services.

In some embodiments, a two-step mode of operation may be used to request information services related to a single still image selected from storage. Here, in the first step of operation, the user navigates the visual imagery available in storage and selects a still image. Optionally, the selected still image may be displayed on the user interface. The user may then request information services related to the still image, in the second step of operation using an input in the form of a single click. Then information services related to the still image are obtained from the system server and presented to the user on the client device user interface. This process in effect creates the user experience of interacting with the selected image.

In some embodiments, a two-step mode of operation may be used to request information services related to a contiguous set of still images or a video sequence captured using the camera integrated into the client device. Here, in the first step of operation, the user points the camera integrated into the client device at the scene of interest and inputs a click hold on an input component to capture the visual imagery. The start of the capture of visual imagery may be marked by the transition of the click hold input component to its clicked state and the end of the capture by the return of the click hold input component to its unclicked state. Optionally, the captured visual imagery may be displayed on the user interface. The user may then request information services related to the visual imagery, in the second step of operation, using an input in the form of a single click. Then the information services related to the visual imagery obtained from the system server may be presented to the user on the client device user interface. This process in effect creates the user experience of clicking on the visual imagery.

In some embodiments, a two-step mode of operation may be used to request information services related to a single video sequence selected from storage. Here, in the first step of operation, the user navigates the visual imagery available in storage and selects a video sequence. Optionally, the selected video sequence may be displayed on the user interface. The user may then request information services related to the video sequence, in the second step of operation using an input in the form of a single click. Then information services related to the video sequence are obtained from the system server and presented to the user on the client device user interface. This process in effect creates the user experience of interacting with the video sequence.

In some embodiments, a two-step mode of operation may be used to request information services related to a plurality of still images, a plurality of video sequences, or a combination thereof, captured by a camera integrated into the client device or obtained from storage. Here, in the first step of operation, the user uses clicks and click holds as described earlier to capture or select the visual imagery. Optionally, the visual imagery may be displayed on the user interface. The user may then request information services related to the visual imagery, in the second step of operation using an input in the form of a single click. Then information services related to the visual imagery are obtained from the system server and presented to the user on the client device user interface. This process in effect creates the user experience of interacting with the visual imagery.

Three-Step Mode of Operation

Here, the operation of some embodiments in which a user requests information services related to visual imagery using three steps of inputs is described. The first step consists of a set of user inputs for capturing visual imagery. The second step consists of a set of user inputs for requesting information options. The third step consists of a set of user inputs for requesting information services related to one or more of the information options presented.

In some embodiments, the first step of operation may trigger the capture of visual imagery by client device 1120. Then, the second step of operation may trigger the creation of a request for related information options, communication of the request to system server 1160, identification and generation of the related information options by system server, communication of the information options to the client device and presentation of the information options on the client device user interface. Then, the third step of operation may trigger the creation of a request for information services related to an information option, communication of the request to system server, identification and generation of the related information services by system server, communication of the information services to the client device and presentation of the information services on the client device user interface.

Figure 6A:
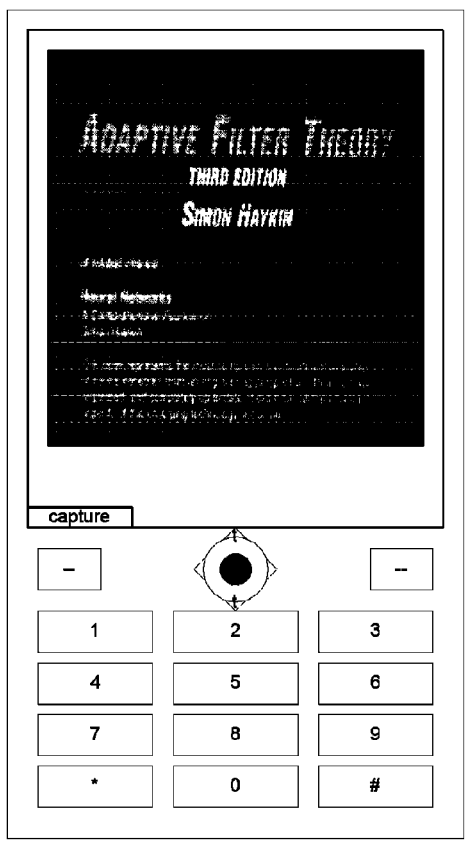
FIG. 6(a) illustrates the presentation of the captured visual imagery, in accordance with an embodiment.
Figure 6B:
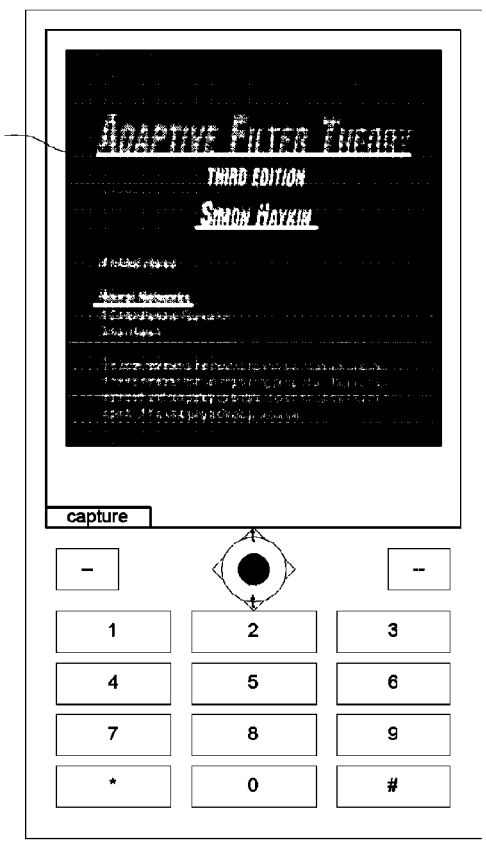
FIG. 6(b) illustrates the presentation of information services augmenting the captured visual imagery, in accordance with an embodiment.

Information options employed in the second step of operation include hotspots, derived information elements, and hyperlinks. Hotspots are spatiotemporal regions of visual imagery that may be demarcated using graphical overlays such as hotspot boundaries, icons, embedded modifications of the visual imagery (e.g., highlighting of hotspots) or through use of audio cues (e.g., the system may beep when a cursor is moved over a hotspot). In some embodiments, the spatiotemporal regions may have spatial dimensions smaller than the spatial dimensions of the visual imagery, e.g., the spatiotemporal regions demarcate a subset of the pixels of the visual imagery. In some embodiments, the spatiotemporal regions may have temporal dimensions that are smaller than the temporal dimensions of the visual imagery, for instance, the spatiotemporal regions may be comprised of a set of adjacent video frames or still images. In some embodiments, the spatiotemporal regions may be demarcated both in spatial and temporal dimensions simultaneously. In some embodiments, hotspots may be presented such that they appear as visual augmentations on the captured visual imagery. FIGS. 6(*b*), 7, and 8 illustrate such augmented presentation of visual imagery.

Information elements derived from visual imagery include text strings or other textual, graphical, or audio representations of visual elements extracted from the visual imagery. For instance, embedded textual information extracted from visual imagery may be presented as text strings on the user interface, using icons to denote their location on the visual imagery or be presented through audio output components using speech synthesis. These elements may be presented to the user in the camera view or in the index view as a list or other such representations. For instance, in one embodiment, all the text strings extracted from the visual imagery may be presented as a list in the index view as information options. The user may choose one or more of the presented text strings to obtain related information services. In some embodiments, the captured visual imagery may be presented along with the derived elements. The derived elements may be presented sorted by relevance to the captured visual imagery. Information elements may also be derived by the system based on other inputs, other system information, and system state.

In some embodiments, a three-step mode of operation may be used to request information services related to a single still image captured using the camera integrated into the client device. Here, in the first step of operation, the user points the camera integrated into the client device at the scene of interest and inputs a click on an input component to capture a single still image. Optionally, the captured still image may be displayed on the user interface. The user may then request information options related to the still image, in the second step of operation, using an input in the form of a single click. The information options related to the still image obtained from the system server may then be presented to the user on the client device user interface. The user may then select one or more information options presented and request related information services in the third step of operation. This process in effect creates the user experience of interacting with the captured image.

FIG. 3 (*c*) illustrates an exemplary process 3300 for capturing a single still image using camera 2214 integrated into client device 1120 and requesting related information services using a three-step mode of operation. Here, a user views the visual scene using the viewfinder integrated into the camera view 3310. The user may optionally align the visual imagery displayed in the viewfinder as required in some embodiments 3320. The user then clicks on a joystick to trigger the system to capture a single still image 3330. The captured still image may be presented in the user interface in viewfinder 3340. The user then inputs a second click to request hotspots or derived information elements 3350. The user is then presented with a set of derived elements demarcated on the visual imagery 3360. The user navigates among these derived element options and selects one of them 3370. The user then requests related information services with a third click 3370. In some embodiments, transient information services may be presented in the transient information view while the information services related to the visual imagery are being generated by the system 3380. The related information services may be then presented in the index view or content view 3390.

In the case of requesting information services related to a single still image, the three-step mode of operation may require exactly three clicks: one for capturing the image, one for the generating a list of information options and the last click for requesting information services based on the default information option.

The selection of one or more information options and the requesting of related information services are analogous to selecting and activating one or more widgets on the user interface in terms of the user experience. Hence, all parameters of interaction with widgets in a graphical user interface using a multifunction input component (e.g., use of multifunction input components, the specific types of user's interaction with the multifunction input component, the visual feedback presented on the graphical user interface, use of accelerated key inputs) apply to the user's interaction with the information options.

In some embodiments, a three-step mode of operation may be used to request information services related to a single still image obtained from storage. Here, in the first step of operation, the user navigates the visual imagery available in storage and selects a still image. Optionally, the selected still image may be displayed on the user interface. The user may then request information options related to the still image, in the second step of operation, using an input in the form of a single click. The information options related to the still image obtained from the system server may then be presented to the user on the client device user interface. The user may then select one or more information options presented and request related information services in the third step of operation. This process in effect creates the user experience of interacting with the selected image.

In some embodiments, a three-step mode of operation may be used to request information services related to a set of contiguous still images or single video sequence captured using the camera integrated into the client device. Here, in the first step of operation, the user points the camera integrated into the client device at the scene of interest and inputs a click hold on an input component to capture the visual imagery. Optionally, the captured visual imagery may be displayed on the user interface. The user may then request information options related to the visual imagery, in the second step of operation, using an input in the form of a single click. The information options related to the visual imagery obtained from the system server may then be presented to the user on the client device user interface. The user may then select one or more information options presented and request related information services in the third step of operation. This process in effect creates the user experience of interacting with the captured visual imagery.

In some embodiments, a three-step mode of operation may be used to request information services related to a set of N still images captured using the camera integrated into the client device. Here, in the first step of operation, the user points the camera integrated into the client device at the scenes of interest and inputs N clicks on an input component to capture a set of N still images. Optionally, the captured still images may be displayed on the user interface. The user may then request information options related to the visual imagery, in the second step of operation, using an input in the form of a single click. The information options related to the visual imagery obtained from the system server may then be presented to the user on the client device user interface. The user may then select one or more information options presented and request related information services in the third step of operation. This process in effect creates the user experience of interacting with the N captured still images. With this process, exactly N+2 inputs are required to request information services related to N still images-N clicks for capturing the images, one click for requesting related information options, and one click to request information services related to the default information option.

In some embodiments, a three-step mode of operation may be used to request information services related to a single video sequence obtained from storage. Here, in the first step of operation, the user navigates the visual imagery available in storage and selects a video sequence. Optionally, the selected video sequence may be displayed on the user interface. The user may then request information options related to the video sequence, in the second step of operation, using an input in the form of a single click. The information options related to the video sequence obtained from the system server may then be presented to the user on the client device user interface. The user may then select one or more information options presented and request related information services in the third step of operation. This process in effect creates the user experience of interacting with the selected video sequence.

In some embodiments, a three-step mode of operation may be used to request information services related to a plurality of still images, a plurality of video sequences or a combination thereof, obtained either from storage or captured using a camera integrated into the client device. Here, in the first step of operation, the user captures or selects the visual imagery as described earlier. Optionally, the visual imagery may be displayed on the user interface. The user may then request information options related to the visual imagery, in the second step of operation, using an input in the form of a single click. The information options related to the visual imagery obtained from the system server may then be presented to the user on the client device user interface. The user may then select one or more information options presented and request related information services in the third step of operation. This process in effect creates the user experience of interacting with the visual imagery.

In the embodiments using a three-step mode of operation described above, the information options are generated and presented by the system. In some embodiments employing the three-step mode of operation, the user may define information elements manually. For instance, a user may use inputs from navigational input components to "draw" the demarcation boundaries of a hotspot. Examples of navigational input components include joysticks, trackballs, scroll wheels, thumb wheels, and other components with equivalent functionality. A cursor and cursor control keys or other appropriate input components integrated into client device may also be used to markup the hotspots. Then, the user may request information services related to the manually demarcated hotspot on the visual imagery using a third step, which may involve inputting a single click.

In some embodiments using a three-step mode of operation, the first step and the second step (i.e., capturing visual imagery and generating associated information elements or hotspots) are combined. Hence, this mode of operation may be considered a special case of a two-step mode of operation. The user inputs for the combined first and second steps captures and processes the visual imagery resulting in a list of information options. The user input for the third step, which now is actually the second step, selects one or more information options and requests related information services.

Zero-Input Mode of Operation

Here, embodiments which use zero user inputs for requesting information services related to visual imagery are described. In some embodiments using a zero-input mode of operation, the user points the camera integrated into the client device 1120 at a scene of interest. The visual imagery from the camera may be optionally displayed on the camera view as a viewfinder. As the user points the camera at the visual scene and scans it, client device 1120 may capture still images or video sequences or a combination of both and requests information services related to the captured visual imagery from the system. The choice of capturing still images versus video sequences versus a combination of them and the instant at which to capture the visual imagery and the durations for which to capture the video sequences may be determined by the system based on various system parameters. System parameters used for capturing the visual imagery may include absolute time, a periodic timer event or environmental factors (e.g., ambient lighting, motion in the visual scene or motion of the camera) and the like.

The system identifies and provides information services related to the visual imagery which are then presented automatically without any user input. Optionally, the provided information services may be presented in the form of graphical marks or icons, as an overlay on the visual imagery presented in the viewfinder. In the user's perspective, as the user scans the visual scene with the client device 1120, he may be presented an augmented version of the visual imagery captured by the camera on the viewfinder.

In some embodiments, visual imagery and associated system and environmental information may be captured using a client device 1120 and used to generate a request for related information services without any user input. The request may be communicated to a remote system server 1160 over a communication network 1140. The system server identifies and generates the related information services and communicates the information services to the client device for presentation on the client device user interface. The information services may then be presented as an augmentation of the visual imagery captured earlier. In some embodiments, the information services may be presented as an augmentation of visual imagery being captured and presented live on the viewfinder, with appropriate processing to account for any client device motion i.e., compensation for global motion in the visual imagery caused by camera motion. In some embodiments, the information services may be presented independent of the visual imagery.

Figure 3D:
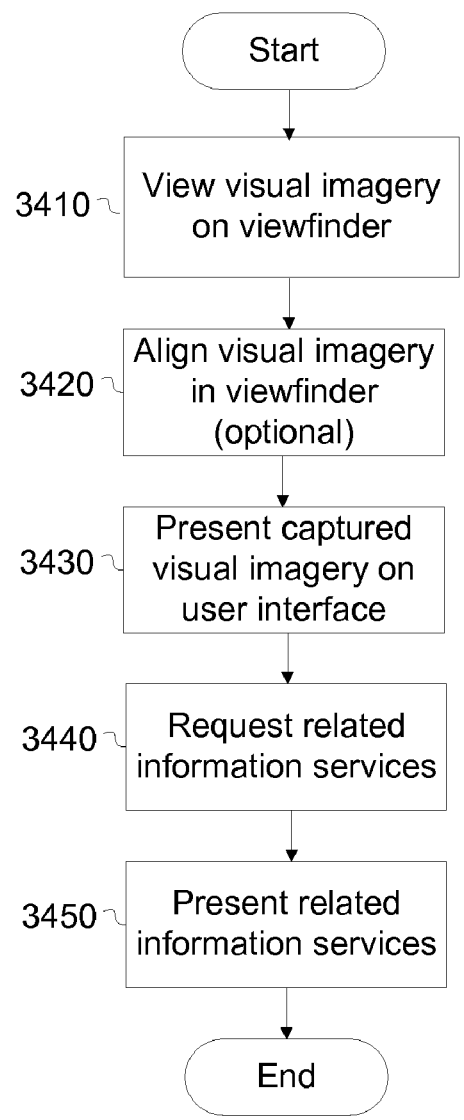
FIG. 3(d) illustrates an exemplary process for requesting information services related to visual imagery using a zero-input mode of operation, in accordance with an embodiment.

FIG. 3(d) illustrates an exemplary process 3400 for capturing a single still image using camera 2214 integrated into client device 1120 and requesting related information services using a zero-input mode of operation. Here, a user views the visual scene using viewfinder integrated into the camera view 3410. The user may optionally align the visual imagery displayed in the viewfinder as required in some embodiments 3420. The client device then automatically captures a single still image and requests related information services from the system 3440. Optionally, the captured still image may be presented in the user interface in viewfinder 3430. The related information services may be then presented in the index view, the content view, or on the camera view as an augmentation of the visual imagery 3450.

In another embodiment using a zero-input mode of operation, the user retrieves and plays back visual imagery stored in client device 1120 or in other components of the system. Upon playback, the client device 1120 automatically selects still images, video sequences or a combination thereof and requests related information services from the system. The related information services provided by the system are then presented to the user on the client device 1120. Optionally, the information services may be presented such that they are integrated with the played back visual imagery for an augmented reality experience.

In this mode of operation, the capture of visual imagery and the requesting of information services related to the visual imagery do not require any explicit user inputs i.e., it is a zero-input mode of operation.

Accelerated User Input

In some embodiments, the user may provide inputs that accelerate the process of providing information services related to visual imagery. In some embodiments, these accelerated user inputs may represent shortcuts to system operations that may otherwise be performed using a plurality of user inputs and operation steps. In some embodiments, these additional inputs may be provided in the final step of the modes of operation described above, such that the system may provide information services accounting for the accelerated user input. In some embodiments, these additional inputs may also be provided after a user is presented the information service such as to help accelerate the process of interacting with information services presented, e.g., limit the information services presented to those from a specific source or database.

The user may perform this additional input by clicking or click holding on one of a plurality of keys integrated into the client device 1120, where each key may be assigned to a particular source or type of information services. For instance, the user may click on a graphical soft button on the display named WWW to request related information services only from the World Wide Web. In another embodiment, the user after capturing the visual imagery may click a specific key on the device, say key marked "2" to request information services related to "shopping."

In these operations, the system searches or queries only specific databases or knowledgebases as defined in the system, filters the identified information services from them as per the user input, and presents the user with a list of related information services. In some embodiments, a plurality of sources of information services may be mapped to each key. In some embodiments, the user clicks on a plurality of the keys simultaneously or in a specific order to select a plurality of sources or types of information services. Also, in other embodiments, the functionality described above for keys integrated into the client device 1120 may be offered by widgets in the user interface. In some embodiments, the functionality of the keys may be implemented using speech or motion based inputs described earlier.

These accelerated user inputs may provide access to features of the system that otherwise may require multiple user inputs in order to achieve the same results. For instance, in some embodiments, accelerated input options may be available for the commands available in the menus or user preference settings.

Multiple Facets of System Operation

In some embodiments, the system may feature multiple facets of operation. The facets enable a user to select between subsets of features of the system. For instance, a specific facet may feature only a subset of information services provided as related to visual imagery. In other embodiments, a specific facet may feature only a subset of the menu commands available for use. Other examples of facets that may be supported by embodiments include one-step mode of operation, two-step mode of operation, three-step mode of operation, zero input step mode of operation, audio supported mode of operation, muted audio mode of operation and augmented user interface mode of operation. In embodiments supporting multiple facets, users may select one among the available set of facets for access to the features of the selected facet. This enables users to use facets i.e., feature sets, appropriate for various use scenarios.

Users may switch between different facets of operation of the system using appropriate user interface elements. For instance, in some embodiments, users may select a specific facet by using a specific input component (e.g., by clicking on a specific key on the key pad) or by activating a specific widget in the user interface (e.g., by selecting and activating a specific icon in the user interface).

Presentation of Information Services

Information services may be provided by the system with various options for presentation and manipulation of the information services. Options include refinement of presented information options, use of multiple user identities, stateful mode of operation, and various methods for augmentation of the visual imagery with information services.

In some embodiments, the information services may be presented in an integrated form in conjunction with the visual imagery for an augmented reality experience. In some embodiments, the information services may automatically transform the source information used to synthesize the information services for appropriate presentation on the client device user interface. Such reformatting includes format conversions such as resizing and compression technique changes and media type conversions such as the conversion of audio to textual information, video sequences to still images and the like. The system may decide on the optimal conversions to perform based on criteria such as user preferences and system capabilities.

In some embodiments, information services may be generated from content available in the World Wide Web. These content are identified and obtained by searching the Web for Web pages with related content. The presentation of such information services may include one or more snippets of the content from the identified Web pages as representative of the content available in its entirety in the Web pages. Such snippets may be generated in real-time at the time of request for information services from the websites or may be previously fetched and stored in the system.

In addition, the information presented may optionally include a headline before the snippets, a partial or complete URL of the Web page and hyperlinks to the source Web pages. The headline may be derived from the title of the associated Web pages or synthesized by interpreting or summarizing the content available in the Web pages. The title or the URL may optionally be hyperlinked to the Web page. The hyperlinks embedded in the information presented enable users to view the Web pages in their entirety if necessary. The user may optionally activate the hyperlink to request the presentation of the Web page in its entirety in a Web browser or on the content view itself.

In some embodiments, the snippets derived from the Web pages may be typically greater than 300 characters in length, if such textual content is available on the Web page. In addition, other nontextual content available on the Web pages such as audio, video, or images may be optionally reformatted and transcoded for optimal presentation on the client device user interface and included in the information service along with the snippets of textual information.

In some embodiments, other software applications or functionality integrated into client device 1120 may be triggered or launched upon the user's activation of specific types of hyperlinks in the content. For instance, when a user clicks on a hyperlink to a Web page, a Web browser integrated into client device 1120 may be launched. Certain hyperlinks may include a phone number which may be dialed by client device 1120 using appropriate client device features when a user clicks on the hyperlink. Other hyperlinks intended for audio or video operations may launch appropriate audio or video players upon user activation. Other hyperlinks may bring up special commercial transaction software for executing commercial transactions.

In some embodiments, when the user requests information services related to visual imagery, sponsored information services may be presented before presentation of the requested information services. Thus the user may be required to view the sponsored information services before viewing the requested information services.

In some embodiments, presentation of information services and lists of information services may include optional identifiers that qualify the information services associated with them. Such identifiers are represented in the form of static visual icons or special textual information markers, special emphasis on textual information, audio signals e.g., sounds or video or animated visual icons. For instance, the commercial or sponsored nature of information services, the fee for accessing commercial information services, the access rights for the information services, the author or source of the information services, the spatial/temporal/geographical location and availability of information services, the nature of the information services in terms of the multimedia types such as audio or video used in the information services and the nature of the information services in terms of the adult or mature content used in the information services may be represented by such identifiers.

In some embodiments, when a list of information service options is presented to the user, the user interface may include hints on whether a specific information service has already been presented to the user. For instance, the emphasis on the text used to represent the information service may be switched from bold to plain or the icon used to represent the information service may be changed. Other means of distinguishing the already presented information services from the yet to be presented information services include use of different colors for the text or different colors for the background. This helps the user keep track of the information services that have already been presented to him.

In addition, the client device user interface may include an option to present the information services in full screen mode, to maximize use of the display integrated into the client device for the presentation of information services. In the full screen mode various widgets presented on the display for control may be minimized or completely eliminated to take advantage of all the available display area for presenting the information services.

The client device user interface may also sport the capability for customization. Such customizations of user interfaces are also referred to as themes or skins. The customization is either specified explicitly by the user or determined automatically by the system based on system and environmental factors. System factors used by the system for customizing the user interface include the capabilities of the client device, the capabilities of the communication network, the system learned preferences of the user and the media formats used in the information services being presented. The user interface may also be customized to represent specific brands or trade identities. This enables brand owners and businesses to provide a user interface to users that is customized with their identity.

Environmental factors used by the system for customizing the user interface include the geographical and spatial location of the client device, the time of day of use of the system, the ambient lighting around the client device and the like. User interface options that are thus customized include color schemes, icons used in the user interface, the layout of the widgets in the user interface, and commands assigned to various functions of the user interface.

In some embodiments, the user interface may be presented using color schemes optimized for presentation on certain types of client devices. For instance, on the backlit displays which are common on client devices such as mobile phones, lighter colored text on a darker colored background provides greater readability and clarity of the text under various lighting conditions as opposed to darker colored text against lighter colored background. Similarly, icons and other widgets used in the user interface are also optimized for the characteristics of the client device characteristics. For instance, icons and widgets that have greater visibility in conjunction with darker colored background may be used.

Refining Presentation of Information Options

In some embodiments, the system may enable users to refine information options presented using various filter criteria. Information options presented by the system that may be filtered include information services, hyperlinks, hotspots embedded in visual imagery, visual elements recognized from the visual imagery, and elements derived from other inputs.

The filter criteria include, but are not limited to, the author of an option, the time of creation of an option, the time of last modification of an option, the location of the creation of an option, the location of last modification of an option, the availability of similar options, the source of information services associated with an option, the regular versus commercial versus sponsored nature of information services associated with an option, textual keywords specified by the user, graphical inputs from the user, user's preferences regarding various options predefined explicitly by the user for the system or learned automatically by the system by analyzing a user's usage of the system, the textual and graphical content of the options, the layout of the options and the metadata associated with the options, In addition the filter criteria may include logical operators such as "and" or "or" specified between the various other filter criteria.

In some embodiments, a user may manually specify the criteria for filtering the information options presented. The user may specify the criteria in textual form using a textual input component such as a keypad, touch sensitive pad, or speech recognized as text by the system. The user may also specify filter criteria using graphical user interface widgets and input components such as a joystick or touch sensitive pad. Other filter criteria enumerated above may be input either using physical buttons with filter criteria explicitly assigned to them or using an input component to select among filter criteria presented on a graphical user interface in the form of graphical and textual widgets such as radio buttons, pull down boxes and menus. In some embodiments the filter criteria may be specified by the user through a website provided by the system.

In some embodiments, a user may not explicitly specify all the criteria used to filter the options presented to the user. Here, the system may automatically infer and define some of the filter criteria. The user may initiate a request for such automatic inference of filter criteria by the system and the generation of such filtered options using specially defined physical buttons on client device 1120 or using an input component in conjunction with a textual or graphical widget on the client device's user interface such as radio buttons, pull down boxes and menus. In such embodiments, while the system automatically infers some criteria used for filtering the options presented to the user, the user may also specify other criteria manually.

The system may rely on various sensors integrated into client device 1120 and computational processes to infer the filter criteria automatically. For instance, time of creation or modification of an information service may be obtained from a clock integrated into client device 1120 or the system and stored if necessary along with the information service in an information service knowledgebase. Location information of the user or client device may be obtained from various positioning systems such as cellular phone networks or Global Positioning System. Criteria such as the source of the information service associated with an option, the regular versus commercial versus sponsored nature of information services, user's preferences of various kinds of options learned automatically by the system, the textual and graphical content of the options, the layout of the options and other metadata associated with information services may be obtained from the various information services and associated metadata.

In some embodiments using such system assisted filtering of information options, when a user is presented with a plurality of information services related to a visual imagery, the user may highlight or select one or more of the information services presented and select an item from a menu to request information services similar to the selected information services. The system then analyzes the content of the selected information services and associated metadata and presents a filtered list of information services that are similar to the selected information services. Some embodiments may also include a menu item to reset the filter criteria to its default state i.e., information options generated with the broadest possible filter criteria. For example, such menu commands may be integrated in to the index view of the user interface.

User Avatars

In some embodiments, the system may provide information services customized to user preferences and users' usage of the system. Such personalization may be associated with user identities maintained by the system such that a user may use more than one user identity with the system. These user identities are termed as "avatars."

An avatar may represent a user to another user, a user group or to the system. An avatar may have its own definitive characteristics. The characteristics may include a name, a visual representation (e.g., an image, a video, a graphical icon), an audio representation (e.g., a voice with a specific pitch, timbre and modulation) and avatar specific preferences (e.g., color scheme used for graphical user interface on client device 1120). An avatar may also have a life span characteristic associated with it i.e., it may exist only for a specified period of time. In some embodiments, users may be able to create a new avatar and assign it characteristics in the system. In some embodiments, users may be able to select and assume an avatar from a predefined set available in the system.

In some embodiments, users may be able to assume multiple avatars simultaneously or assume different avatars one after the other over a period of time. A user that assumes multiple avatars simultaneously may be able to have different avatars for different users or different user groups. A user may also assume different avatars for different information services. Users' avatars may be stored in a database in the system.

In some embodiments, a user may expose and share the information services and the information associated with the information services created by him to another user using his avatar. In this case, the second user may only see the information services and the information associated with the information services as created by an avatar and may never know the real name or identity of the user that has assumed the avatar.

In some embodiments, a user may be able to create an avatar using tools provided by the system on the client device 1120. In some embodiments, a user may be able to create an avatar using tools provided on a web site integrated with the system. When creating a new avatar, a user may assign a new name to an avatar and select avatar characteristics from a predefined collection.

For example, the user may select an image from a list of images provided and assign it to an avatar. Similarly, a user may select an avatar voice from the list of voices provided. In some embodiments, users may be able to upload or create avatar characteristics by themselves. For example, a user may be able to upload new images and assign it to an avatar. Also, a user may create a new voice to be assigned to an avatar. When creating a new voice a user may select its pitch, timbre, and modulation with the tools provided on the client device or website.

In some embodiments, a user may be able to trade his avatar to another user in the system. The trade may be accompanied by a financial transaction, which may be setup as an auction or as a fixed price transaction.

In some embodiments, the characteristics of an avatar may be used to customize an information service and the information associated with the information service. For example, an audio information service created by a user may be transformed and presented using the voice of an avatar when the information service is presented using that avatar.

Stateful Mode of Operation

In some embodiments, the operation of the system may incorporate knowledge of the interactions of a user with the system across a plurality of sessions of use of the system by the user. Such knowledge of a user's interaction history may enable the system to provide additional functionality. This is referred to as the stateful mode of operation. The system may be configured to maintain user inputs and system processing characteristics associated with a user session for an extended period of time. In some embodiments, the period may be a finite duration, while in some embodiments, it may be an infinite duration.

A stateful mode of operation may be implemented in the system using a finite state machine. Each operation of the system by a user, inputs of a user or the events generated by the system may change the state in the state machine with the system maintaining a record of the various parameters associated with each state.

The states maintained by the system may enable the system to track the order of events or operation of the system. If the order of occurrence of two different inputs, operations or events are reversed the system may not necessarily provide the same behavior as the behavior resulting from the inputs in the original order. In the state machine, moving from state A to state B may not necessarily produce the same system outputs as moving from state B to state A. However, sometimes the outputs from the state machine for both order of state transitions may appear identical to an external observer.

In some embodiments, when parameters associated with different states are used in providing information services, the parameters may be associated using logical operators such as "and," "or," and "not." In other embodiments, mathematical and rule based computational models may be employed to provide information services. The computational model may take into account parameters such as states of the system, time, location, user preferences, system characteristics, metadata associated with the visual imagery and visual characteristics derived from the visual imagery. State information may be maintained on client device 1120 or on other components of the system.

The persistence of states across various operations may or may not be evident to a user. In some embodiments, the state persistence may be evident and the user may have an option to remove specific previous inputs being used to determine the operation of the system. For example, a user may input three visual imageries and request information services after each input. After the third visual imagery input the user may have an option to remove the first or second visual imagery. As an example, he may be able to remove the second visual imagery and make the system operate as if the third visual imagery is input right after the first visual imagery. In some embodiments, a user may have an option to reset the state machine. This helps the user to restart the operation of the state machine from its initial state.

A stateful mode of operation becomes evidently useful to a user when he captures multiple visual imageries and requests information services sequentially. For instance, if a user uses visual imagery A to access related information services followed by visual imagery B to access information services related to visual imagery B, the system may use both visual imageries A and B to identify related information services. This behavior may help the user to interactively narrow down the information services presented as related to visual imagery by adding additional visual imageries.

In an example scenario, a user may capture the name of a restaurant in a visual imagery and request related information services. He may be provided with a list of information services related to the restaurant name by the system. Then, the user may capture a city name in another visual imagery and request related information services. Now the system may provide information services related to the restaurant in that particular city using both visual imageries. The user may again capture another visual imagery with a name of another restaurant and request related information services. Now, the system may provide information services related to both the restaurants in that particular city using all the three visual imageries.

Although the above examples illustrate cases with still images, the visual imageries may be still images, video sequences or a combination of them. Also, user inputs in textual or audio form may also be used control the state changes. For instance, continuing the previous example, after obtaining the information services related to the visual imagery containing the name of the restaurant, the user may textually input the city name using a keypad, and then request related information services. The system may change the states in the state machine and generate information services from the new state taking into account both the previous visual imagery and the user's text input.

Stateful mode of operation may also be used to author new information and information services. As in the case of retrieving information services, a user may use inputs such as visual imageries and other inputs to create contexts that are generated by a combination of multiple inputs. The user may author new information or information services associated with the generated contexts.

Figure 4A:
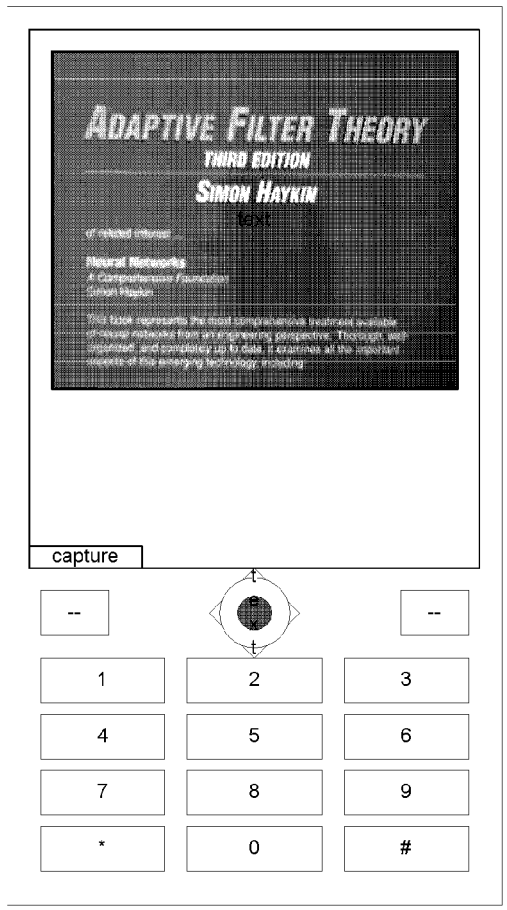
FIG. 4(a) illustrates the presentation of visual imagery while presenting information services independent of the captured visual imagery, in accordance with an embodiment.
Figure 4B:
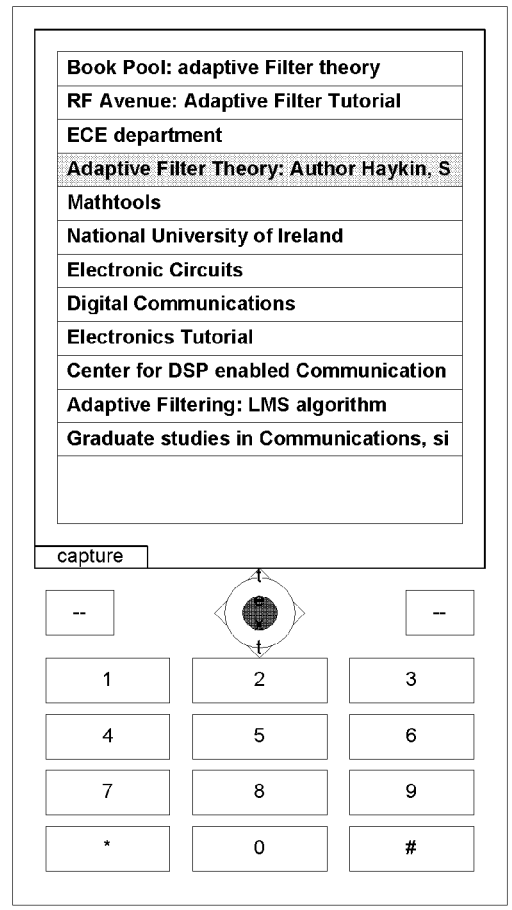
FIG. 4(b) illustrates the presentation of information services while presenting information services independent of the captured visual imagery, in accordance with an embodiment.

FIGS. 4(*a*) and 4(*b*) illustrate an embodiment in which the stateful mode of operation is implemented with at least two user interface views, i.e., a camera view 4100 and an index or content view 4200. Also, there may be two different input components on the client device 1120 that may enable the stateful mode, one used for capturing imagery and the other used to browse the resulting information services. A user may capture visual imagery by triggering the capture using camera view 4100. When the first visual imagery is captured, the display may switch to the index view 4200 and show the related information services. Then the user may scroll through the list of information services using a second input component for browsing the information services. At that instant, the user may also have the opportunity to capture additional visual imagery using the capture input component. If the user clicks on the capture input component, the display on the client device 1120 may switch back to the camera view 4100. Then, the user may click on the capture input component again to capture a second visual imagery. After the capture, the display may switch back to the index view 4200. Now the information services related to the combination of both the first visual imagery and the second visual imagery may be presented on the index view. This process may be repeated any number of times in order to identify information services related to all the visual imagery. This implementation is a derivative of the one step operation described earlier. In some embodiments, the same behavior may also be implemented with the two step, three step or zero-input modes of operation described earlier.

Figure 5:
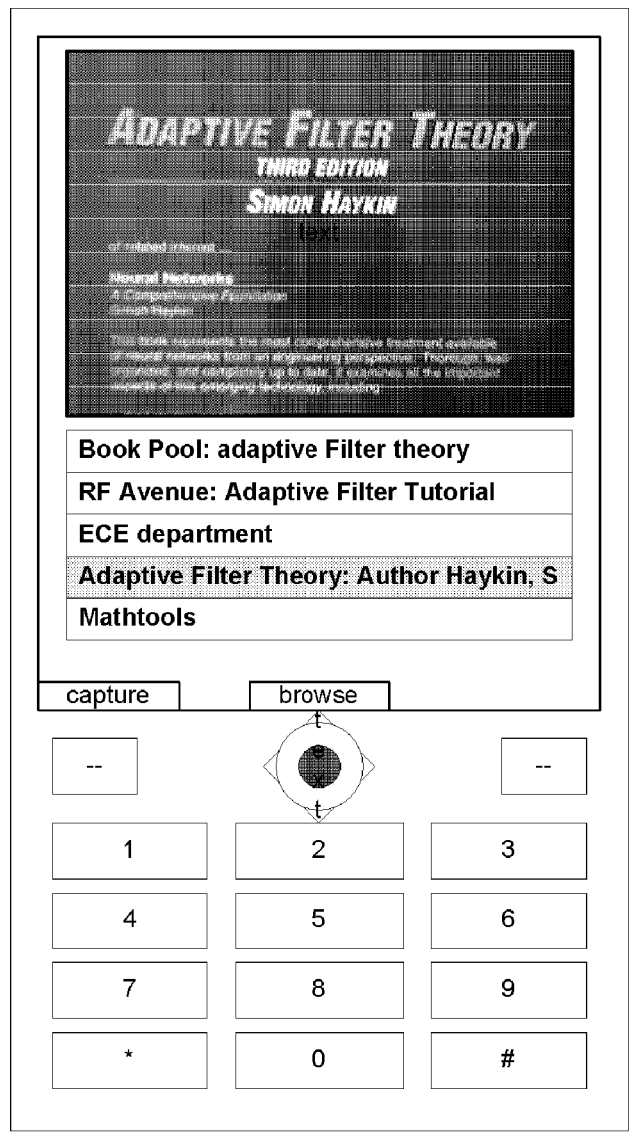
FIG. 5 illustrates the presentation of information services in conjunction with the captured visual imagery, in accordance with an embodiment.

FIG. 5 illustrates an embodiment 5100 where the camera viewfinder and the list of information services are presented on the same view. For instance, a viewfinder may be presented above followed by the identified list of related information services below it. In such an embodiment, after every additional visual imagery is captured, the list of information services may be updated taking into account the new additional input. The spatial layout of the viewfinder and the list of information services may vary in different embodiments. However, in this implementation, there is no switching between views and hence, one less user input is required for each capture of visual imagery and request of related information services. As in the case of two view implementation, this is a variation of the one step operation described earlier. In some embodiments, the same behavior may also be implemented with the two-step, three-step, or zero-input modes of operation described earlier.

In some embodiments, as described in an earlier example, there may be two input components: one for capturing visual imagery and one for browsing the resulting list of information services. In some embodiments, the capture and browsing through the list may be implemented using a single input component using different graphical widgets for different operations. In some embodiments, the capturing and browsing the list may be implemented using a single input component with different directions of motion representing different operations. In some embodiments, the capture may be implemented using an input component in conjunction with a menu, while the browsing functionality may be implemented using a second input component. In other embodiments, other combinations of input components may be used.

Augmentation of Visual Imagery

Visual imagery sourced either from a camera integrated into the system or from stored visual imagery may be presented in augmented form i.e., augmented with information services or information options. In the "active" mode of augmentation, augmented visual imagery is presented without additional user inputs, as in the case of the zero-input mode of operation. In the "passive augmentation" mode, the user captures the visual imagery and requests an augmented presentation of the visual imagery using explicit inputs. In either modes of augmentation, the augmentation may indicate the availability of information services identified by the system as related to the visual imagery, information options or the availability of system identified contexts. In some embodiments, an information service may itself provide an augmented version of the visual imagery.

Augmentation may be accomplished by modifying spatiotemporal regions of the visual imagery or by presenting audio information through audio output components. As used herein, such modifications are referred to as "augmentation elements." One or more of such augmentation elements may be distributed spatially and temporally on the visual imagery. Augmentation elements may be activateable, i.e., they may react and respond to user inputs. Augmentation elements may be selected and activated using by input mechanisms such as clicks, click holds, toggles, widget select, widget activate, widget hold and widget toggle as described earlier. When activated the augmentation elements may provide a list of information services, provide an information service, launch other applications or functionality, or provide other options for the user.

In some embodiments, activating an augmentation element may not necessarily provide an identical set of information services every time it is activated. In some embodiments where the augmentation elements represent information options or contexts, the selection of an augmentation element may also provide an opportunity for the user to author new information and information services associated with the information option or context. Thus the augmentation elements act as "hypothetical hyperlinks" on the visual imagery i.e., the hyperlinks are not part of the original visual imagery. But they appear to be part of the visual imagery when the visual imagery is captured or viewed using a client device.

Some augmentation elements may modify the visual imagery such that they are hard to distinguish from the rest of the visual imagery. Examples of such augmentation elements include changing the color of the text in the underlying visual imagery and changing the color of a region in the visual imagery. In another example, photorealistic objects generated by techniques such as Image Based Rendering may be inserted into the visual imagery such that the objects are hard to distinguish as inserted objects. Some augmentations clearly overlay on the visual imagery and are easily distinguishable. Augmentation elements may be semi transparent or opaque with respect to the visual imagery. Also, augmentation elements may overlap each other on the visual imagery.

In some embodiments, augmentation elements may be implemented in the form of modifying the formatting attributes of a text in the visual imagery. Examples of such augmentation include changing the formatting attributes such as font, size, color, background color; changing style such as underlining the text; changing the emphasis such as making the text bold or italics and others. FIG. 6(*b*) illustrates an example of such augmentation of the original visual imagery in FIG. 6(*a*), where the text is underlined 6210.

Figure 7:
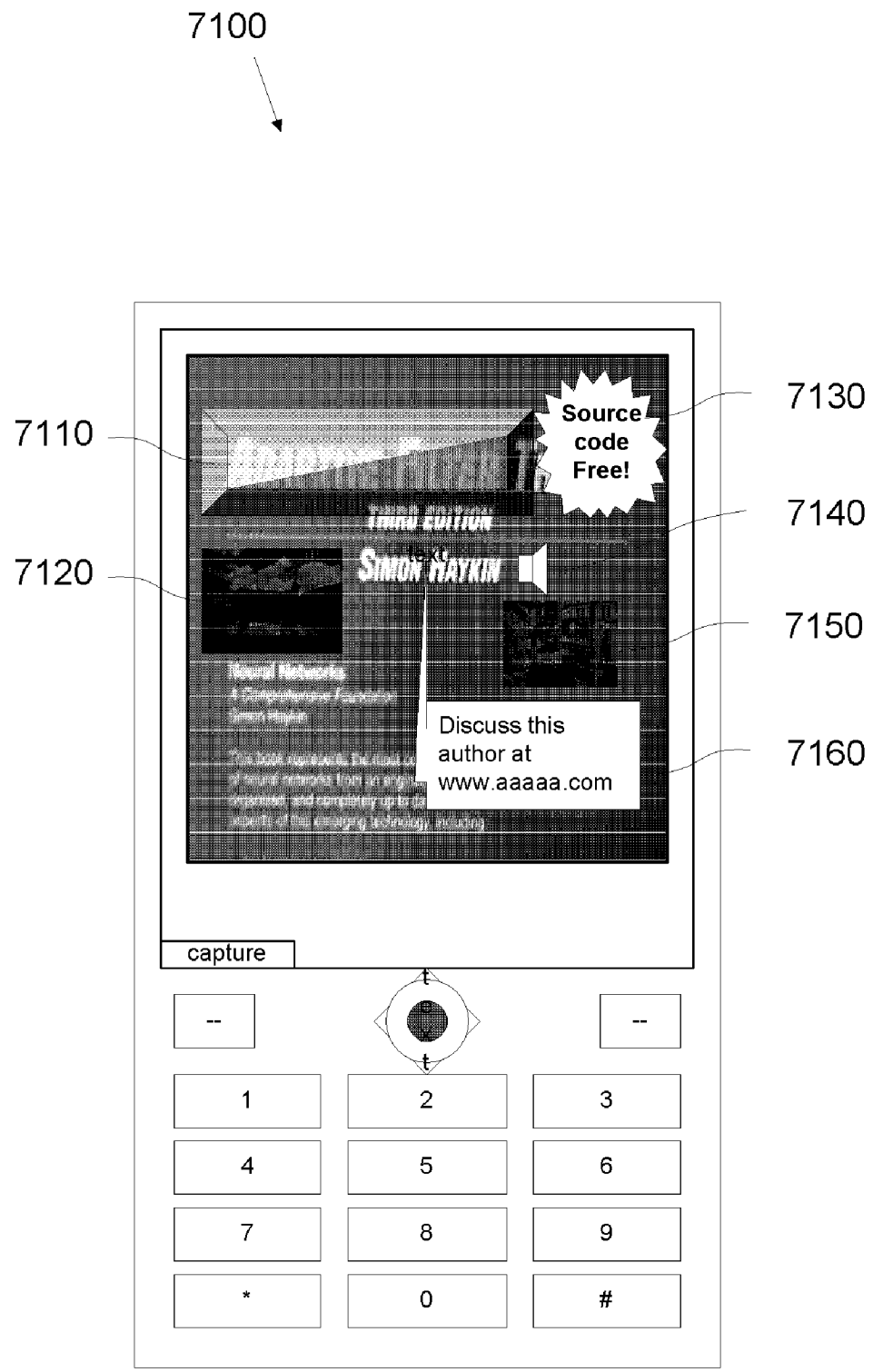
FIG. 7 illustrates an exemplary presentation of information services augmenting visual imagery, in accordance with an embodiment.
Figure 8:
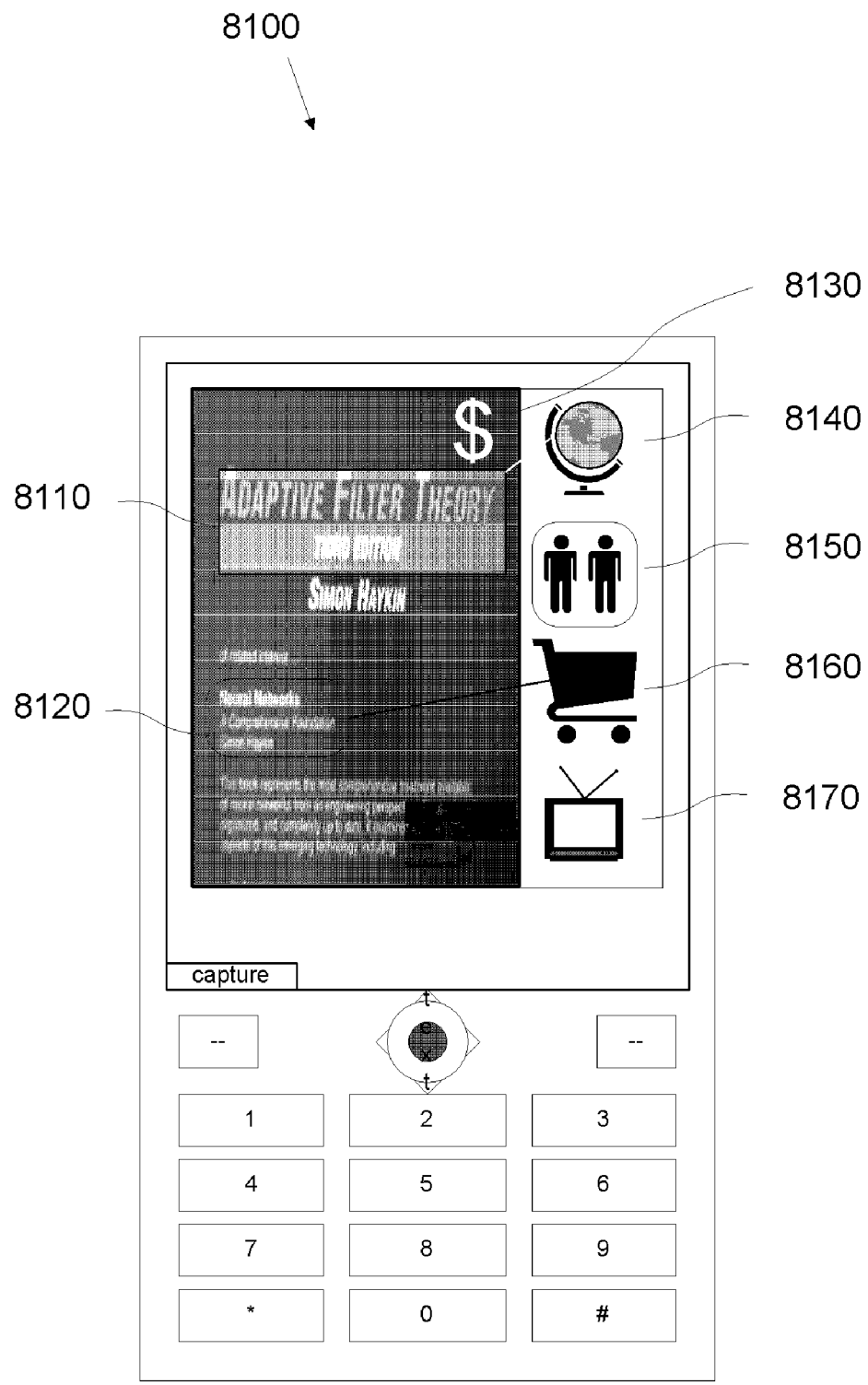
FIG. 8 illustrates an alternate exemplary presentation of information services augmenting visual imagery, in accordance with an embodiment.

FIGS. 7 and 8 illustrate some examples of augmentation of visual imagery. In some embodiments, photorealistic synthetic objects may be inserted into various spatial locations on the visual imagery. In some embodiments, augmentation elements may be implemented as additional text overlaid on the visual imagery 7160.

In some embodiments, augmentation elements may be implemented in the form of graphical elements superposed on the visual imagery. Example of such augmentation include superposing graphical elements such as icons 7140, smiley faces, emoticons, symbols, alphabets, blinking lights, different types of callouts (7130, 7160), and other graphical elements on to the visual imagery.

In some embodiments, augmentation elements may be implemented by demarcating certain regions of the visual imagery with graphical shapes and modifying the properties of the visual imagery within the shape. The graphical shapes may be semi transparent or opaque (7110, 8110). Examples of graphical shapes include geometrical shapes such as circles, lines, rectangles, triangles and the like 8120. The graphical shapes may also be non geometrical shapes. For example a graphical shape of a shoe may appear in a certain region of the visual imagery indicating augmentation.

In some embodiments, augmentation elements may be implemented with images or video sequences such as thumbnail images or video sequences (7120, 7150). In this case, the captured visual imagery may be augmented with thumbnail visual imageries that may be distributed spatiotemporally over the captured visual imagery. The augmentation thumbnail images may be images of an information service, images of authors of an information service, images of avatars or others. Also, the thumbnail video sequences may be video sequences of the usage of information services, computer synthesized video sequences, graphical animations or others.

In some embodiments, augmentation elements may be implemented as audio output. For example, when a user scans or observes a visual scene using a viewfinder the user may hear various audio signals indicating the presence of information services or information options. The audio signal may be a beep, synthesized music, a song, a speech, and the like. In some embodiments, the audio signal may also be user recorded audio signal such as an avatar voice or a user greeting. The availability of audio augmentation elements may also be indicated visually using icons 7140.

In some embodiments, augmentation elements may lie outside the boundaries of the visual imagery 8140-8170. Also, augmentation elements may be partially inside and partially outside the visual imagery.

Augmentation elements may be static or dynamic. Examples of static augmentation elements include text and images. Examples of dynamic augmentation elements include graphical animations and videos. Some augmentation elements may be static when presented but may become dynamic upon activation. For instance, a video augmentation element may be showing a frame of the video as a static image when presented, but may start playing the video when selected. In another example, a static graphical object such as an emoticon may become animated when selected.

Augmentation elements on a visual imagery may be navigated, selected, and activated using an input component on the client device. Navigating through the available augmentation element options enables a user to select any particular augmentation element and activate it to invoke the associated information services. When an augmentation element is selected, a feedback may be provided by modifying the augmentation element.

For instance, upon selection an augmentation may appear highlighted by changing an attribute of the augmentation element such as color, border, style or other attributes. In another example, upon selection, an augmentation element may change its shape or its image. In another example, upon selection an augmentation element may make audio outputs like a beep. In another example, selecting an augmentation element may play an audio segment such as a song 7140.

In some embodiments, selecting an augmentation element may provide more information or metadata about that augmentation or an information service. For example, selecting an emoticon may pop up a graphic to display the name of the author of the information service and time of authoring. In another example, selecting an augmentation element may replace that augmentation element with another augmentation element.

In some embodiments, an activated augmentation element may also get modified. For instance, an activated augmentation element may get modified to indicate to the user that it has already been activated. Such modification of augmentation elements may be implemented in various methods as detailed earlier in the case of modification on selection. In some embodiments, an activated augmentation element may become inactive after a certain number of uses and may not be activated again.

In some embodiments, augmentation elements may represent metadata associated with the information services such as location, time, language or others. In some embodiments, augmentation elements may indicate the nature of the associated information service, i.e., whether it is a sponsored, commercial or regular information service. These three different types of information services may be represented by distinct augmentation elements such as different types of text, color, graphics, or others. For example a commercial information service may be represented with "$" signs 8130 and sponsored information services may be represented by a "Free" logo 7130.

In some embodiments, augmentation elements may also indicate the media types of associated information services. For instance, a "speaker" icon 7140 may represent an audio information service; a "television" icon 8170 may represent a video information service; a cartoon may indicate an animation.

In some embodiments, augmentation elements may indicate the author of the information services. The author information may be the domain name of a web page. In the case of user authored information services, the augmentation element may be names, avatar names, avatar images or other avatar characteristics representing the authors.

In some embodiments, augmentation elements may represent user groups that are associated with the information services 8150. User groups may be represented by names, images or other distinct characteristics associated with a user group.

In some embodiments, upon selection and activation of an augmentation element, another augmented version of the visual imagery may be presented. In some embodiments this may help in user initiated filtering of information options as described earlier. For instance, selecting or activating an augmentation element in the form of a text may result in another augmented version of the visual imagery. The new augmented version of the visual imagery may be augmented with augmentation elements based on the previously selected or activated text augmentation element.

In some embodiments, augmentation elements may represent whether the associated information services lead to shopping or other financial transactions. For instance, a specific graphic symbol such as a shopping cart 8160 may represent that the associated information service provides a shopping service.

The process of synthesizing augmented visual imagery from the visual imagery and augmentation elements may be distributed between client device 1120 and system server 1160. In some embodiments, client device 1120 may synthesize an augmented visual imagery using data from system server 1160. In some embodiments, client device 1120 may synthesize augmented visual imagery by itself. In some embodiments, a system server 1160 may synthesize an augmented visual imagery and send it to the client for display. In some embodiments, the synthesis may be take place partially on client device 1120 and partially on a system server 1160.

Distribution of the synthesis process between client device and system server may be determined based on various factors such as the capabilities of the client device, capabilities of communication network 1140, user preferences, nature of information service and type of augmentation.

The distribution of the synthesis process may either be static or dynamic. In case of static distribution, a system may be preconfigured to handle part of the synthesis process on a client and a part on a system server. In the case of dynamic distribution, the distribution may be determined based on various system, user and network characteristics and may change over time.

In some embodiments, the augmented visual imagery may also be stored by the system for later retrieval. In some embodiments, the augmented visual imagery may be stored on a client device 1120, while in other embodiments they may be stored on a system server 1160. The stored augmented visual imagery may be retrieved using client device 1120 or using other tools such as a web browser or a photo album software application. In some embodiments, the augmentation elements may be stored independent of the visual imagery. In some embodiments, a modified version of the visual imagery i.e., the visual imagery modified by the augmentation elements, is stored.

In some embodiments, the augmented visual imagery may also be communicated using communication mechanisms such as email, MMS, SMS, and instant messaging. The recipients of the communication may be users of the system or other third parties. In some embodiments, the communication may be transported to the recipient through the system server or directly from the client device 1120 itself. In some embodiments, the communication may be transported using other communication components external to the system. When an augmented visual imagery is communicated, the augmented visual imagery itself or a reference (e.g., hyperlink) to the visual imagery may be communicated. The communicated augmented visual imagery may be received and presented using client device 1120 or using other tools such as Web browser or email software application.

Figure 9:
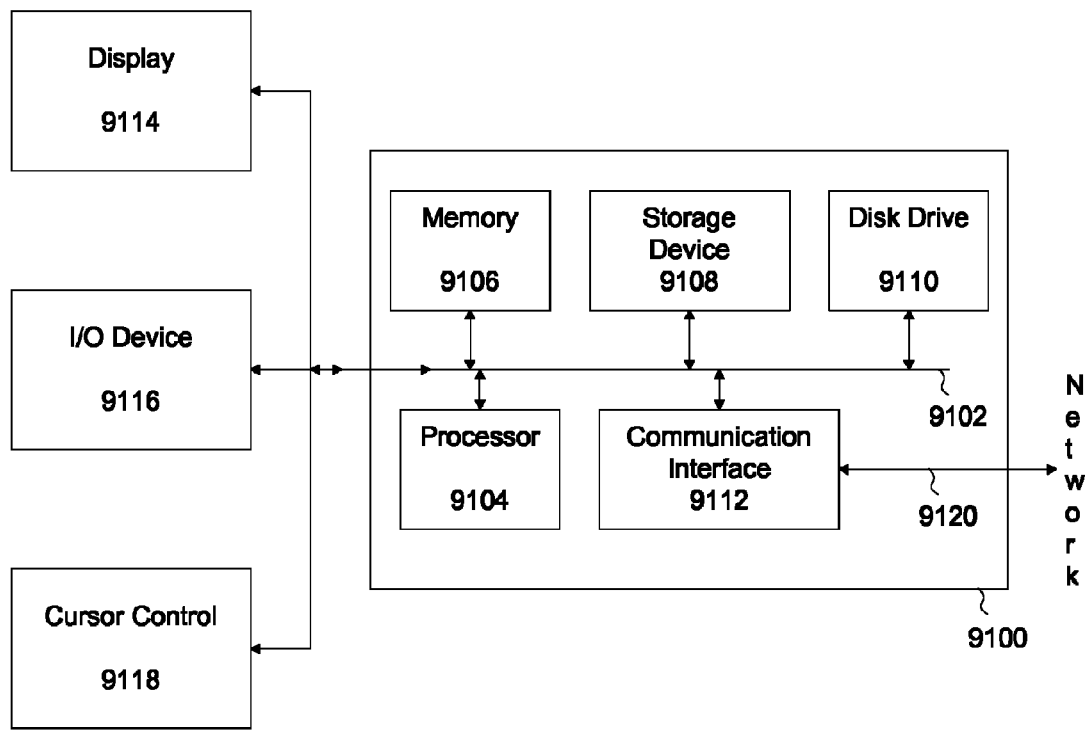
FIG. 9 is a block diagram illustrating an exemplary computer system suitable for providing information services related to visual imagery, in accordance with an embodiment.

FIG. 9 is a block diagram illustrating an exemplary computer system suitable for providing information services related to visual imagery. In some embodiments, computer system 9100 may be used to implement computer programs, applications, methods, or other software to perform the above described techniques for inferring knowledge from visual imagery and computing their value.

Computer system 9100 includes a bus 9102 or other communication mechanism for communicating information, which interconnects subsystems and devices, such as processor 9104, system memory 9106 (e.g., RAM), storage device 9108 (e.g., ROM), disk drive 9110 (e.g., magnetic or optical), communication interface 9112 (e.g., modem or Ethernet card), display 9114 (e.g., CRT or LCD), input device 9116 (e.g., keyboard), and cursor control 9118 (e.g., mouse or trackball).

According to some embodiments, computer system 9100 performs specific operations by processor 9104 executing one or more sequences of one or more instructions stored in system memory 9106. Such instructions may be read into system memory 9106 from another computer readable medium, such as static storage device 9108 or disk drive 9110. In some embodiments, hard wired circuitry may be used in place of or in combination with software instructions to implement the system.

The term "computer-readable medium" refers to any medium that participates in providing instructions to processor 9104 for execution. Such a medium may take many forms, including but not limited to, nonvolatile media, volatile media, and transmission media. Nonvolatile media includes, for example, optical or magnetic disks, such as disk drive 9110. Volatile media includes dynamic memory, such as system memory 9106. Transmission media includes coaxial cables, copper wire, and fiber optics, including wires that comprise bus 9102. Transmission media may also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer may read.

In some embodiments, execution of the sequences of instructions to practice the system is performed by a single computer system 9100. According to some embodiments, two or more computer systems 9100 coupled by communication link 9120 (e.g., LAN, PSTN, or wireless network) may perform the sequence of instructions to practice the system in coordination with one another. Computer system 9100 may transmit and receive messages, data, and instructions, including program, i.e., application code, through communication link 9120 and communication interface 9112. Received program code may be executed by processor 9104 as it is received, and/or stored in disk drive 9110, or other nonvolatile storage for later execution.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
upon detecting a click of a button at a wireless camera phone, starting recording of a first video of a scene of interest, wherein the scene of interest comprises text;
upon detecting a release of the button, ending recording of the first video and sending the first video to a server system, wherein the first video comprises a sequence of images, wherein a first image of the sequence comprises a first portion of the text, and a second image of the sequence comprises a second portion of the text;
extracting the first portion of the text from the first image using a text recognition engine;
extracting the second portion of the text from the second image using the text recognition engine;
generating at the server system a plurality of contexts based on the extracted first and second portions of the text;
querying a database using the plurality of contexts to generate a list of information services;
sending the list of information services to the wireless camera phone; and
when playing the first video on the wireless camera phone after the sending the list of information services to the wireless camera phone, overlaying a second video comprising the list of information services on the first video.

2. The method of claim 1 comprising during the extracting the first and second portions of the text using a text recognition engine, the generating at the server system a plurality of contexts, and the querying a database using the plurality of contexts, playing a video of an advertisement on the wireless camera phone.

3. The method of claim 1 comprising during the playing the first video on the wireless camera phone, detecting motion of the wireless camera phone via an accelerometer of the wireless camera phone; and
after the detecting motion, pausing the playing of the first video.

4. The method of claim 3 wherein the after the detecting motion comprises pausing playing of the second video comprising the list of information services.

5. The method of claim 1 wherein during the overlaying a second video comprising the list of information services, the method comprises:

receiving an indication to filter the list of information services; and after the receiving the indication, selecting a filter; and applying the selected filter to the list of information services.

6. The method of claim 5 wherein the indication comprises a speech input.

7. The method of claim 6 wherein the speech input comprises filter criteria.

8. The method of claim 5 wherein the selected filter to apply to the list of information services is based on user preferences.

9. The method of claim 5 wherein the selected filter to apply to the list of information services is based on knowledge of a user's interaction history with at least a subset of information services in the list of information services.

10. The method of claim 5 wherein the receiving an indication to filter the list of information services is via a graphical user interface component displayed on the wireless camera phone.

11. The method of claim 1 wherein the overlaying a second video comprising the list of information services on the first video, comprises displaying an icon for each information service in the list of information services to indicate an information service type.

12. A method comprising:

upon detecting a click of a button at a wireless camera phone, starting recording of a first video of a scene of interest, wherein the scene of interest comprises text;

upon detecting a release of the button, ending recording of the first video and sending the first video to a server system, wherein the first video comprises a sequence of images, wherein a first image of the sequence comprises a first portion of the text, and a second image of the sequence comprises a second portion of the text;

extracting the first portion of the text from the first image using a text recognition engine;

extracting the second portion of the text from the second image using the text recognition engine;

generating at the server system a plurality of contexts based on the extracted first and second portions of the text;

querying a database using the plurality of contexts to generate a list of information services;

sending the list of information services to the wireless camera phone; and when playing the first video on the wireless camera phone after the sending the list of information services to the wireless camera phone, overlaying graphics comprising the list of information services on the first video.

13. The method of claim 12 wherein the button is a graphical button displayed on a display of the wireless camera phone.

14. The method of claim 12 wherein the button is a physical button of the wireless camera phone.

15. The method of claim 12 wherein the generating at the server system a first plurality of contexts based on the extracted first and second portions of the text comprises using location information of the wireless camera phone.

16. The method of claim 12 wherein the generating at the server system a first plurality of contexts based on the extracted first and second portions of the text comprises using knowledge of a user's interaction history.

17. The method of claim 12 wherein the first video comprises speech input and the generating at the server system a plurality of contexts comprises using the speech input.

18. The method of claim 17 wherein the speech input comprises speech from a user of the wireless camera phone and speech from a person in the scene of interest.

19. The method of claim 12 wherein the graphics are semi-transparent.

20. The method of claim 12 wherein the graphics are opaque.

* * * * *